United States Patent
Janzen et al.

(10) Patent No.: US 9,359,021 B2
(45) Date of Patent: Jun. 7, 2016

(54) CONFIGURATION OF A TWO-TRACK TRACTOR

(71) Applicant: CLAAS INDUSTRIETECHNIK GMBH, Paderborn (DE)

(72) Inventors: David C. Janzen, Metamora, IL (US); Ronald L. Satzler, Princeville, IL (US)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 14/249,662

(22) Filed: Apr. 10, 2014

(65) Prior Publication Data

US 2014/0216828 A1    Aug. 7, 2014

Related U.S. Application Data

(62) Division of application No. 13/748,778, filed on Jan. 24, 2013, now Pat. No. 8,727,047.

(60) Provisional application No. 61/590,990, filed on Jan. 26, 2012.

(51) Int. Cl.

| | |
|---|---|
| *B62D 55/02* | (2006.01) |
| *B60G 17/016* | (2006.01) |
| *B62D 49/06* | (2006.01) |
| *B62D 11/10* | (2006.01) |
| *B62D 37/04* | (2006.01) |
| *B62D 11/24* | (2006.01) |
| *B62D 29/00* | (2006.01) |
| *B62D 49/00* | (2006.01) |
| *B62D 55/116* | (2006.01) |

(52) U.S. Cl.
CPC .............. *B62D 55/02* (2013.01); *B60G 17/016* (2013.01); *B62D 11/10* (2013.01); *B62D 11/24* (2013.01); *B62D 29/008* (2013.01); *B62D 37/04* (2013.01); *B62D 49/00* (2013.01); *B62D 49/0621* (2013.01); *B62D 49/0635* (2013.01); *B62D 55/116* (2013.01)

(58) Field of Classification Search
CPC ..... B62D 55/02; B62D 55/04; B62D 49/0635
USPC ........................................................ 180/9.38
See application file for complete search history.

(56) References Cited

U.S. PATENT DOCUMENTS

| | | | | |
|---|---|---|---|---|
| 3,937,288 A | * | 2/1976 | Kehler | 180/9.3 |
| 4,313,516 A | * | 2/1982 | Terry | 180/185 |
| 5,174,405 A | * | 12/1992 | Carra et al. | 180/9.32 |
| 5,337,846 A | * | 8/1994 | Ogaki et al. | 180/8.2 |
| 5,575,347 A | * | 11/1996 | Uchibaba | B60G 5/04 |
| | | | | 180/9.1 |
| 6,155,363 A | * | 12/2000 | Matsumoto et al. | 180/9.34 |
| 6,164,399 A | * | 12/2000 | Bays | 180/9.5 |
| 6,948,783 B2 | * | 9/2005 | Hoff | 305/144 |
| 7,628,235 B2 | * | 12/2009 | Satzler et al. | 180/9.21 |
| 7,673,711 B1 | * | 3/2010 | Berg | 180/9.21 |
| 8,348,001 B2 | * | 1/2013 | Isfort | A01D 41/12 |
| | | | | 180/209 |

(Continued)

*Primary Examiner* — Anne Marie Boehler
*Assistant Examiner* — Marlon Arce
(74) *Attorney, Agent, or Firm* — Michael J. Striker

(57) ABSTRACT

An agricultural tractor includes a pair of track assemblies including rubber treads with track bars, a front wheel assembly and a controller. The track assemblies are interconnected by respective front and rear axles extending substantially perpendicular to a direction of travel. The controller automatically controls a load imposed on the front wheel assembly in order to control the load imposed at the front axle of the track assemblies to minimize rubber tread wear.

10 Claims, 19 Drawing Sheets

(56) References Cited

U.S. PATENT DOCUMENTS

| | | | |
|---|---|---|---|
| 2004/0090020 A1* | 5/2004 | Braswell | F16F 9/46 280/5.515 |
| 2008/0179124 A1* | 7/2008 | Stratton | 180/197 |
| 2010/0051358 A1* | 3/2010 | Inaoka | 180/9.1 |
| 2013/0255354 A1* | 10/2013 | Hawkins et al. | 73/7 |
| 2014/0324301 A1* | 10/2014 | Rebinsky | 701/50 |

\* cited by examiner

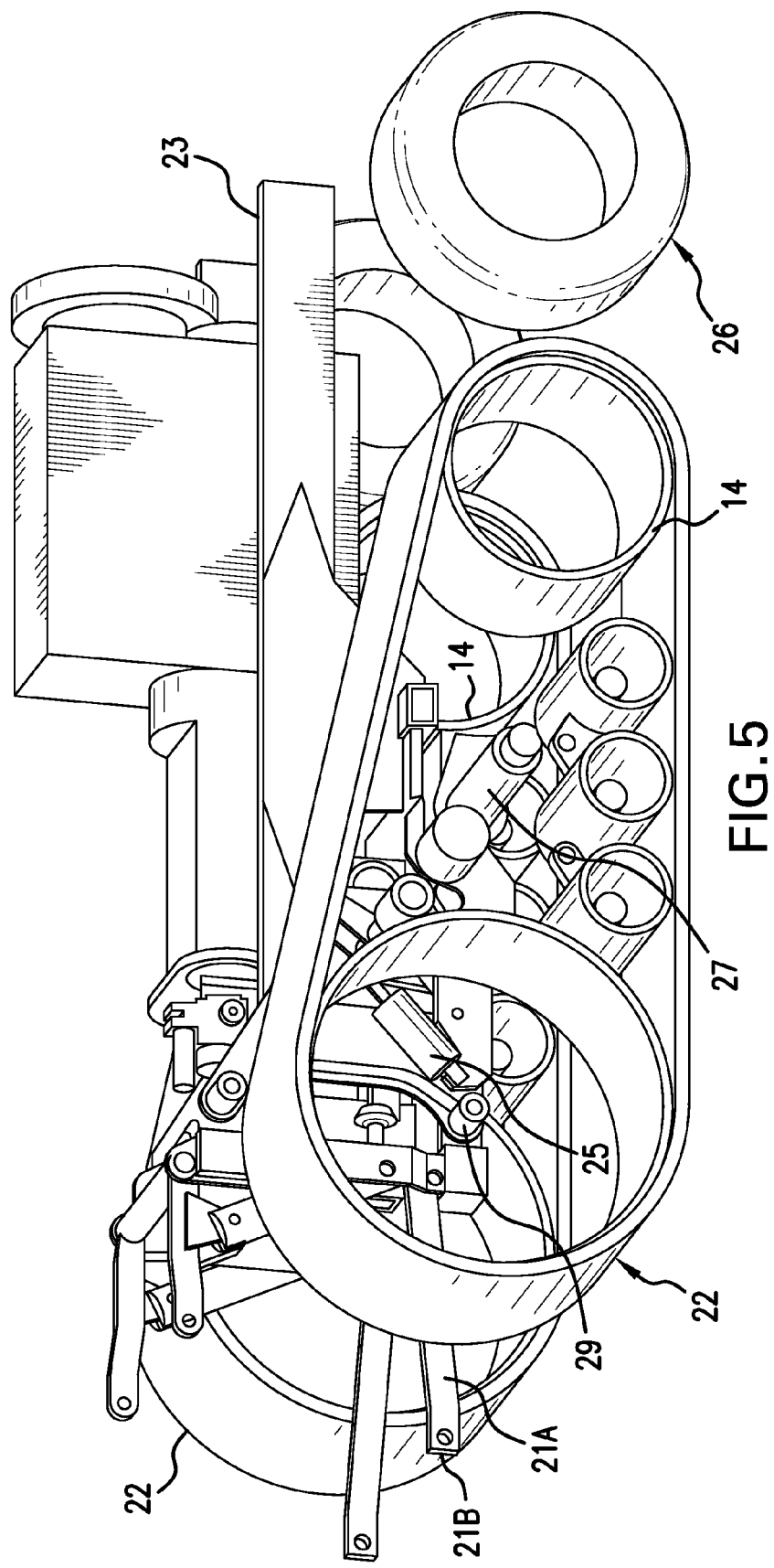

CONFIGURATION OF A TWO-TRACK TRACTOR

CROSS-REFERENCE TO RELATED APPLICATION

This application is a Divisional application of U.S. patent application Ser. No. 13/748,778, filed on Jan. 24, 2013 (the "parent" application), and claims priority to the parent application under 35 USC 119(e). The parent application claims priority from U.S. Provisional Patent Application 60/590,990, filed Jan. 26, 2012 (the "provisional" application. The subject matter of the parent application and the provisional application is incorporated by reference herein.

BACKGROUND OF THE INVENTION

The present invention relates generally to an apparatus for a tractor having two tracks. More specifically, the apparatus is an improved configuration for a tractor having two track assemblies and a wheel assembly in front of the track assemblies, which wheel assembly is automatically controlled to adjust an amount of weight on the wheel assembly, for example, to limit or eliminate slip and thereby an amount of wear on tread bars of the track assemblies. Such apparatus thereby solves multiple problems encountered with current two-track tractors using two rubber belt tracks.

Both a two-track tractor configuration and a half-track tractor configuration are well known. The earliest large farm tractors often were half-track configurations having a combination of steel tracks and wheels. For traction, tracks were chosen because they provided better performance characteristics than wheels. For mobility in soft terrain, tracks were better than wheels.

The original main purpose of the wheel mechanism in front was to steer the tractor. Tracks had good characteristics for fieldwork. In order to steer, however, a significant percentage of the total weight had to be carried on the front wheel mechanism. This caused the tractor to be extra heavy. Partial sinking of the front wheel mechanism compromised the conventional tractor's mobility in soft terrain. Later, a steering system was developed that relied on creating a track speed difference between the two tracks. This speed difference system worked well for steering and allowed for the front wheel mechanism to be removed. Removal of the front wheel mechanism allowed for all of the tractor's weight to be used for traction purposes and for mobility improvements in soft terrain.

Steel tracks with sharp grouser tips have a disadvantage of not being able to travel on paved roads because they tend to damage the road's surface and because of slow travel speeds. With the advent of paved roads and farmers' fields becoming farther apart, the use of steel tracks came into disfavor. The preferred tractor configuration became the wheel tractor using only tires. For tractors that are used primarily for pulling heavy loads, it is preferred that all wheels be powered in order that all the weight can contribute to drawbar forces. The two main steering systems that are currently used for wheel tractors are Ackerman steer for small tractors and articulated steering for large tractors.

Around 1985, a two-track crawler tractor became available that used rubber belt tracks, as distinguished from steel tracks. This crawler tractor with rubber belt tracks could now travel on the road without damage to the road and also travel at higher speeds both in the field and on the road. An advanced steering system, known in the art as differential steer, was further developed and used on this two-track crawler tractor.

Currently, there are two different rubber belted Ag tractor configurations available in the market. One configuration has two tracks and the other configuration has four tracks.

The dynamics of the two-track configuration include the following: the standard two-track configuration has a steady state harsh ride during road travel because the amount of weight on the track assembly's front spindle is excessive during road travel and because the rear of the tractor has no suspension. This excessive amount of weight up front also causes rapid wear-out of the rubber belts.

The process causing rapid wear-out involves the motion of the rubber belt's portion that is wrapped around and is traversing the front spindle's wheel (see FIG. 1). This wheel is located inside the belt, at the front of the belt, and is called the front idler. This portion of the tread bar's tips, when traveling tangentially around the front idler, travels faster relative to a baseline speed than when such portion travels on the straight portions of the belt. The baseline speed is here defined as the speed of the belt's inextensible reinforcement package. This faster travel about the idler happens because the tread bar tips, when traveling in an arc around the front idler, are at a larger radius than is the radius of the belt's reinforcement package, measured from the rotational center of the front idler.

This speed ratio of the tread bar's tips to the reinforcement package is the direct ratio of these two radii. That is, referencing the belt's inextensible reinforcement package as being the speed of the vehicle, the portion of tread bar tips traveling tangentially around the front idler are moving faster than the speed of the vehicle. For that matter, it is generally known by those skilled in the art that when tire tread bars or belt tread bars travel at a speed different than the vehicle's speed, the phenomena "slip" occurs. Slip causes wear on the tread bar tips and the rate of wear is proportional to the contact force between the tip and the ground.

The process causing rapid wearout of tread bars is specifically related to the events happening directly below and slightly ahead of the front idler's centerline, at a point where tread bar tips are starting to engage the ground, i.e., transitioning from an unloaded state to a loaded state.

As depicted in FIG. 1, when the standard two-track (only the right track 12 is shown in FIG. 1) tractor configuration is traveling on the road, the load on the front idler 14 is excessive, as indicated by the load (L) as a function of positioning along the length of the tracks with respect to the direction of travel. Clearly, the load at position "I" of the track, directly under the idler axle centerline 14A (which is coincident with the tipping fulcrum), is where the maximum load or weight is realized. This excessive load causes excessive compression in the tread bars below the front idler's centerline 14A. This compression, in turn, causes the initial contact point of the tread bars to happen several centimeters forward of the idler's centerline.

As described above, the tread bar's tips contact the ground with slip. Slip continues as long as the belt is in a condition of being wrapped around the front idler. During the several centimeters of slip, the contact force between the tread bar's tip and the ground increases from zero to the maximum value (at "I" as shown in FIG. 1). The result is a rapid rate of wear on the tread bar's tip at this location (i.e., proximate the front idler 14) when the tread bar's tip is transitioning from an unloaded state to a loaded state.

The harsh ride referred to above results from this transitioning of the tread bar's tips from an unloaded condition to a condition of excessive load in combination with the large spacing of the tread bars, i.e., about 8" or 200 mm. This is the fore aft spacing between belt's tread bars. This creates a ride effect similar to that created by rumble strips on a highway.

This dynamic situation translates into the need to frequently replace expensive rubber track belts.

It is also known that tractors tend to transfer vertical load off their front support means and onto their back support means when pulling a drawbar load. Drawbar pull generates a pitch moment that is approximately equal to the amount of drawbar pull multiplied by drawbar height. The vertical load transfer is the reaction to the pitch moment. For the standard two-track configuration, drawbar pull transfers vertical load off the front of the track assemblies and onto the rear of the track assemblies.

For the rubber belt tracks to have their best traction efficiency and best floatation characteristics, it is necessary to have the tractor's weight equally distributed under the track assemblies; front to back. The standard two-track configuration typically uses counterweights at the front of the tractor's center structure intending to accomplish an equally distributed weight profile under the track assemblies, front to back, during fieldwork that normally encounters large amounts of drawbar pull. This situation is referred to as being properly balanced for fieldwork.

When the tractor's balance is biased for a large amount of drawbar pull in the field, then it is improperly balanced when traveling on the road where small amounts of drawbar pull are the norm, as shown in FIG. 1. Exceptions to the norm include towing heavy wagons up steep grades. The normal situation, when traveling on the road, is each track assembly's front idler carries a large percent of the vehicle's weight.

During certain operations in the field, the amount of drawbar pull tends to vary as the tractor traverses the field. This, in turn, causes the weight distribution under the tracks to vary in proportion to varying drawbar pull as the two-track tractor configuration traverses the field. Non-uniform weight distribution under the tracks increases fuel consumption, increases track slippage, increases track wear, and increases soil compaction.

For good traction characteristics in the field, it is desirable to use an aggressive tread bar pattern, such as a chevron pattern, on the belt and to space the tread bars about 200 mm (8 inches) inches apart. When traveling on the road, this large spacing of the tread bar, in combination with the heavy load on each track assembly's front idler, is the source of an annoying and continuous vibration for the operator to tolerate: like a continuous rumble strip.

Another situation occurring during field operations is the standard two-track tractor configuration pitches harshly under certain conditions such as traveling at right angles over a ridge. The pitch motion may cause the operator to experience discomfort, injury, or lose control of the tractor.

The standard two-track tractor configuration is not suspended at the rear axle. This further contributes to operator discomfort and high stresses within the tractor's structure.

During a steering maneuver, the standard two-track tractor configuration often encounters a braking action on the track assembly that is on the inside of the turn radius. This is because an inside track braking force is often needed to overcome lateral traction forces. Other situations exist when both track assemblies are experiencing braking actions and when the brake forces need to be uneven from side to side for steering purposes, e.g., when a tractor is pushed by a heavy wagon when going down a steep grade and maximum brake capacity is needed in order to maintain the operator's maximum allowed speed.

If a steering correction is needed and, because the inside track of the steering correction's turn radius is at its braking limit, the track on the outside of the turn radius must then give up some of its brake force in order to make a steering correction. The net result is the velocity of the tractor's centerline and of the wagon increases. The brakes are then unable to decelerate the tractor and wagon back to the operator's maximum allowed speed.

Another possible result caused by the wagon's pushing the tractor is a resulting forward pitch moment that further increases the vertical load on the front of the track assemblies and lessens the load on the rear. The resulting forward pitch amplitude increases the height of the drawbar and in turn pitches the wagon's tongue backwards, imposing an upward jackknife between the tractor's drawbar and the wagon's tongue more likely.

SUMMARY OF THE INVENTION

The present invention provides a two-track tractor assembly and tractor including same that overcome the shortcomings of known arts.

In an embodiment, the invention provides apparatus for a tractor having two rubber track assemblies and a wheel assembly in front of the track assemblies that automatically controls the amount of weight on the wheel assembly, for example, to limit or eliminate slip and thereby an amount of wear on tread bars of the track assemblies.

The inventive apparatus solves a number problems encountered with the conventional two-track tractor configurations using rubber belt tracks. That is, the invention improves the harsh ride encountered by the operator during road travel in a conventional two-track tractor, slows the rapid wear of the belt's tread bars normally encountered during road travel in a conventional two-track tractor, alleviates non-uniform weight distributions under the track assemblies normally encountered in a conventional two-track tractor, alleviates occasional severe pitch and its discomfort to the operator, that might normally be encountered during road travel in a conventional two-track tractor, accounts for unfavorable location of the center of gravity without counterweights in a conventional two-track tractor, alleviates certain unfavorable situations regarding vehicle control that can occur in a conventional two-track tractor, overcomes problems associated with supplemental steering in conventional two-track tractors; obviates a need for suspension at the rear of the tractor, as required in a conventional two-track tractor; overcomes the problem of excessively cantilevered front-mounted implements, which is typically found in prior art two-track tractors and minimizes ground disturbance when turning, as compared with known two-track tractors.

A tractor configuration includes a mainframe structure, a control station having a means of controlling the tractor, an undercarriage system having one left side and one right side track assembly, a wheel mechanism containing one or more wheels located forward of the track assemblies, a power train for forcing both track assemblies to travel at the same or different speeds, a controller responsible for exerting force to transfer vertical load back and forth between the front portion of the track assemblies and the wheel mechanism and controlling the amount of weight carried by the wheel mechanism. The controller causes or allows the wheel or wheels of the wheel mechanism to follow the tractor's curved path caused by track speed difference.

Preferably, the front axle suspension comprises an active suspension.

In another embodiment, the invention provides an agricultural tractor with a pair of track assemblies including rubber treads with track bars, the track assemblies interconnected by respective front and rear axles extending substantially perpendicular to a direction of travel, a front wheel assembly and a controller or a control system that automatically controls a load imposed on the front wheel assembly in order to control the load imposed at the front axle of the track assemblies to minimize rubber tread wear.

Preferably, the controller controls turn angle geometry to maintain correct alignment for a pivot turn, controls the load when carrying a front mounted implement and embodies a microprocessor that executes a set of computer instructions, stored in a computer memory, or other memory storage device or structure, that when executed carry out the balancing to minimize tread wear.

BRIEF DESCRIPTION OF THE DRAWINGS

Aspects of the disclosed technology will become apparent upon reading the following detailed description and upon reference to the accompanying drawings in which, like references may indicate similar elements:

FIG. 5 is a right rear-side perspective view of the two-track tractor depicted in FIGS. 2 and 3;

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The present invention, in an embodiment, provides apparatus for a tractor having two rubber track assemblies and a wheel assembly in front of the track assemblies that automatically controls an amount of weight that is imposed on the wheel assembly, for example, to limit or eliminate slip and thereby an amount of wear on tread bars of the track assemblies.

As described above, some of the problems uniquely solved by the invention are:
1. Eliminate or greatly reduce harsh ride and vibration;
2. Provide suspension for the rear driver;
3. Eliminate extreme sensitivity to pitch including hump sensitivity;
4. Significantly reduce tread bar wear;
5. Achieve uniform load under mid-wheels, idlers and drivers;
6. Reduce the concentration of components and their weight at the rear of the tractor, which has resulted excessive front length and excessive front counter weight on two-track tractors;
7. Reduce ground disturbance when turning;
8. Provide good balance with front mounted implements;
9. Eliminate the need for a supplemental steering system; and
10. improve road handling characteristics for easy driving on a public road.

Figure 1:
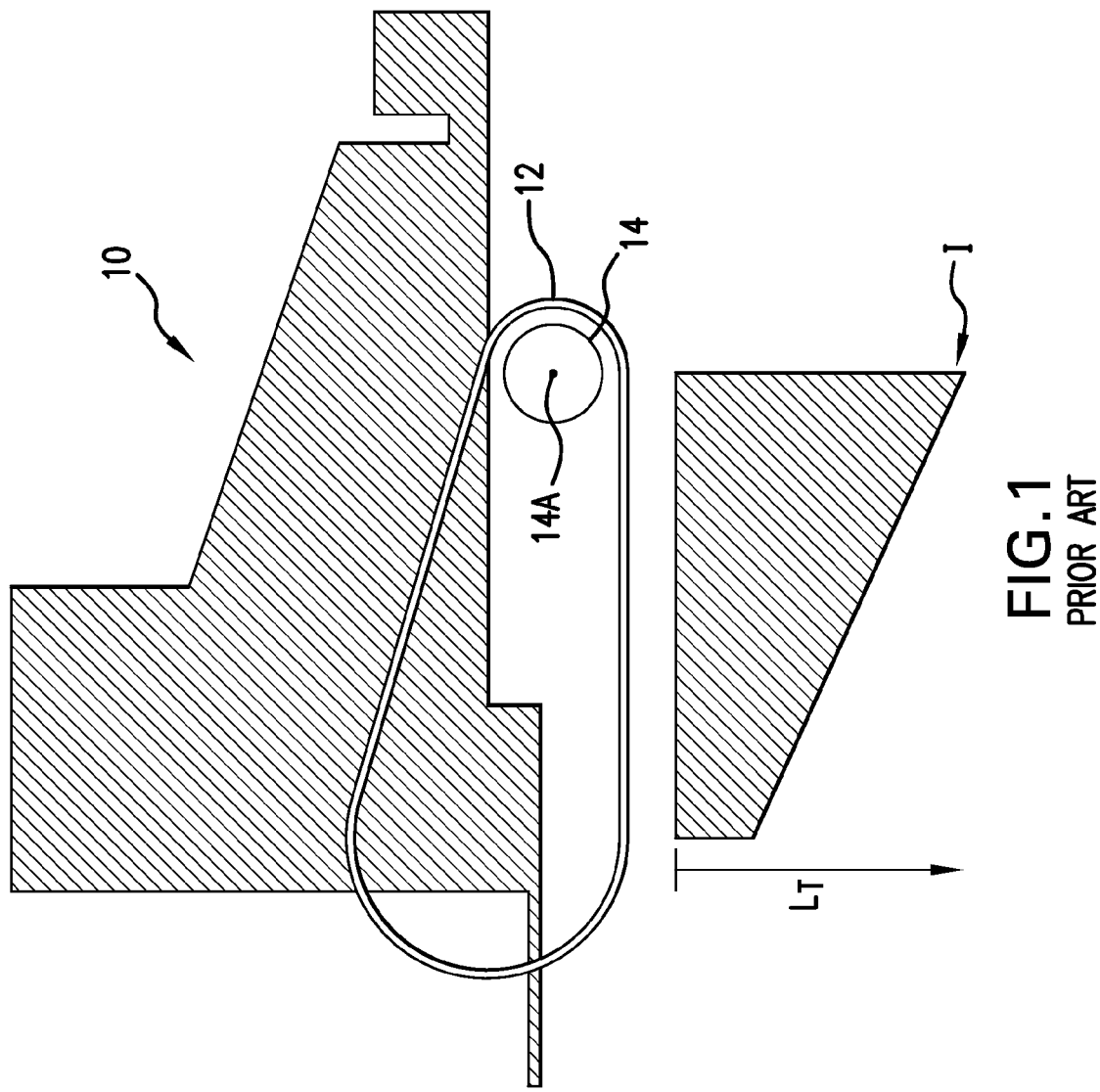
FIG. 1 is a right-side illustration of a standard configuration two-track tractor, including a weight profile during road travel (Prior Art)

FIG. 1 represents a right-hand side of a conventional two-track tractor with two rubber belt track assemblies 12. The weight profile under the tracks as shown is representative of the tractor's traveling on a road. The heavy weight at the front of the track assemblies is indicated by I and the lighter weight at the rear of the track assemblies is indicated by $L_T$), in combination with typical tread bars spaced apart, induces a vibration into the entire tractor causing damage to the tractor and discomfort to the operator as well as rapid wear to the tread bars when traveling on roads.

Figure 2:
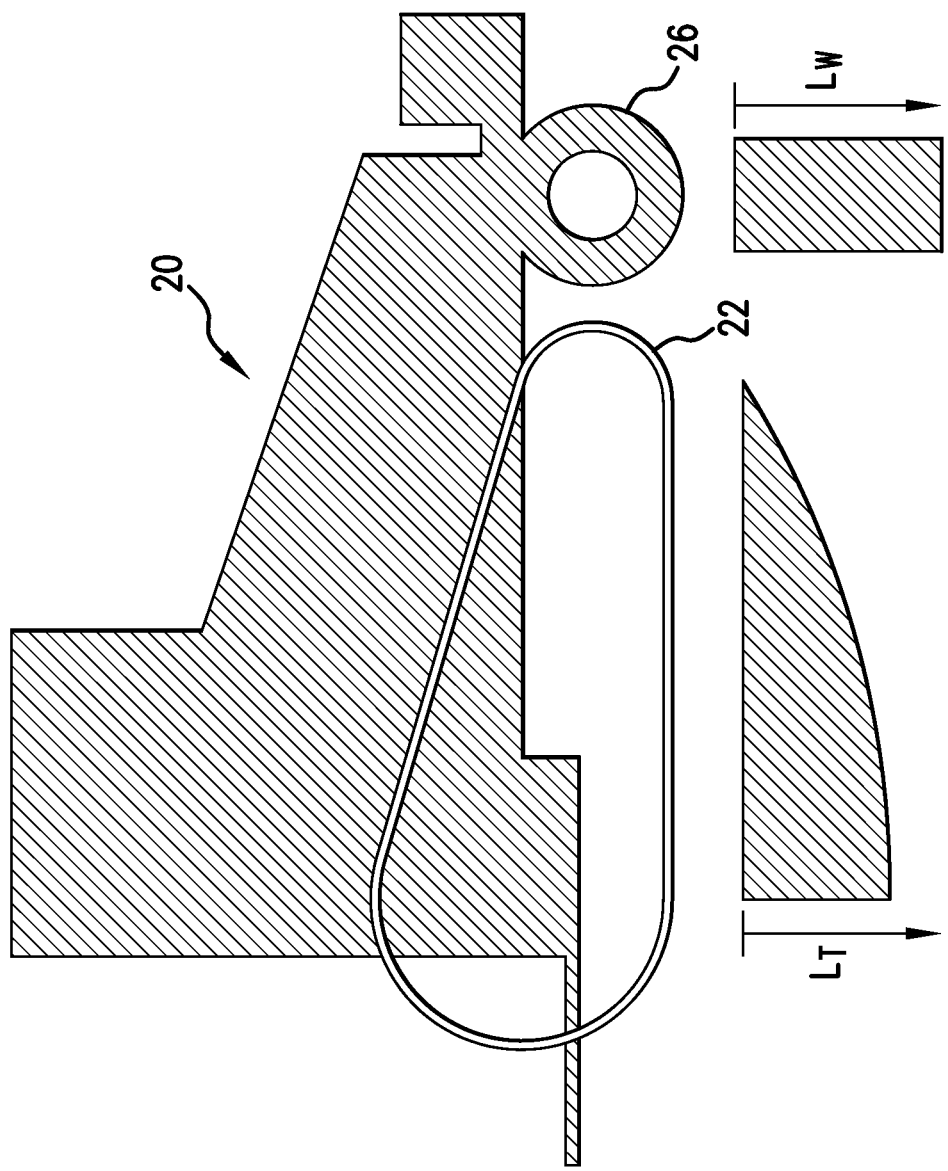
FIG. 2 is a right-side illustration of a two-track tractor, including a weight profile during road travel, of one embodiment of the present invention.

FIG. 2 depicts a two-track tractor 20 of the invention, having a pair of track assemblies 22 and a front wheel assembly 26. The track assemblies 22 and the front wheel assembly have respective weight profiles (i.e., loads (L)), under the length of the tracks ($L_T$; in the direction of travel) and under the wheels ($L_W$; as shown), when traveling on roads. Including the wheel assembly controlled to support the maximum load, as shown in FIG. 2, greatly reduces vibration and tread bar wear when traveling on roads as compared to conventional two-track tractors that to not include a front wheel assembly so controlled. With the invention, the operator is more comfortable and the tractor is not prone to damage from vibrations.

Figure 3:
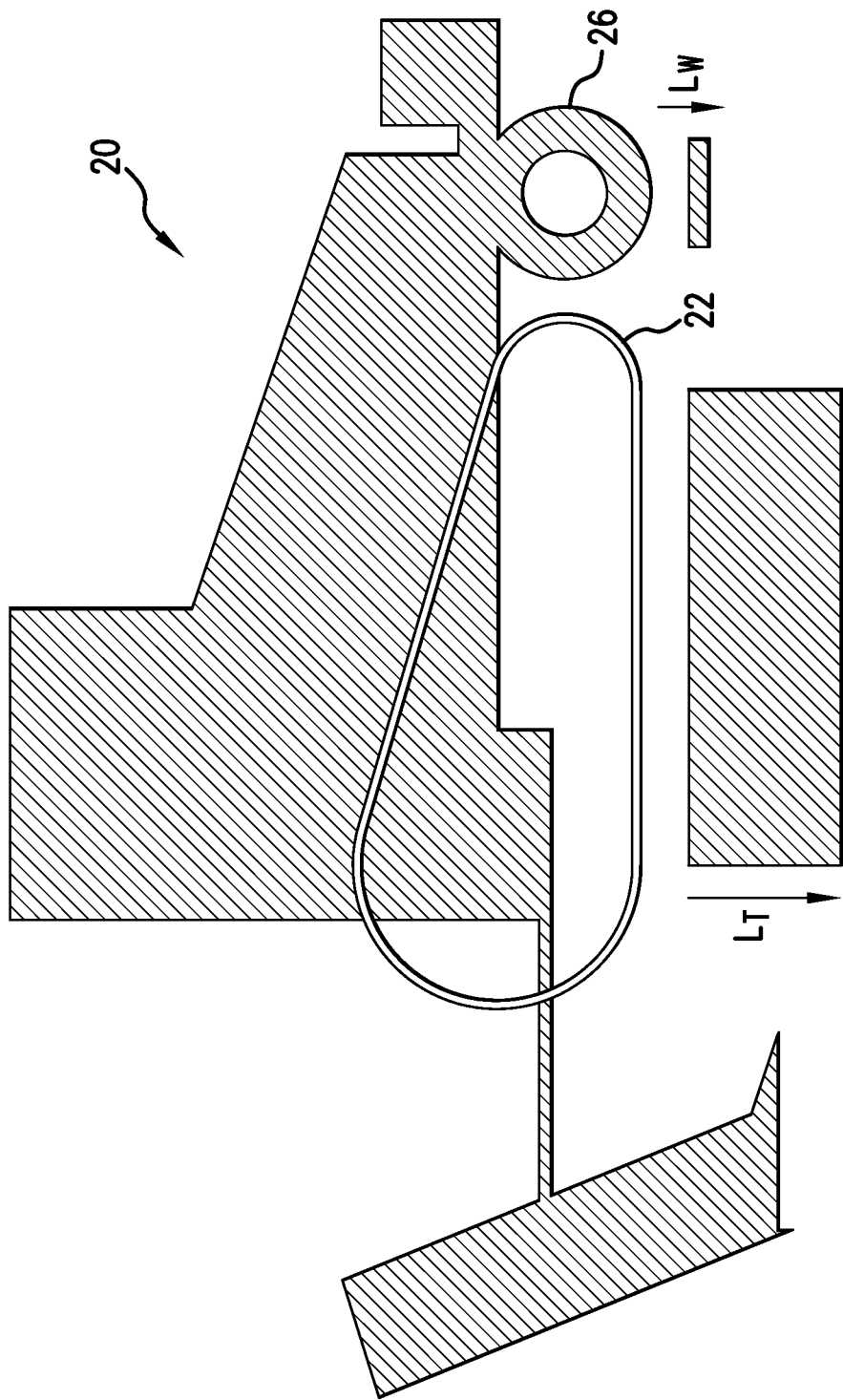
FIG. 3 is a right-side illustration of a two-track tractor, including a weight profile during fieldwork, of the two-track tractor embodiment depicted in FIG. 2.

The invention includes mechanisms and a control system that deliberately causes this weight or load profile. FIG. 3 depicts the embodiment (of FIG. 2) during fieldwork. Therein, the desired weight profile under the track assemblies ($L_T$ as shown in FIG. 3) and of the front wheel assembly ($L_W$ as shown in FIG. 3) are illustrated.

Figure 4A:
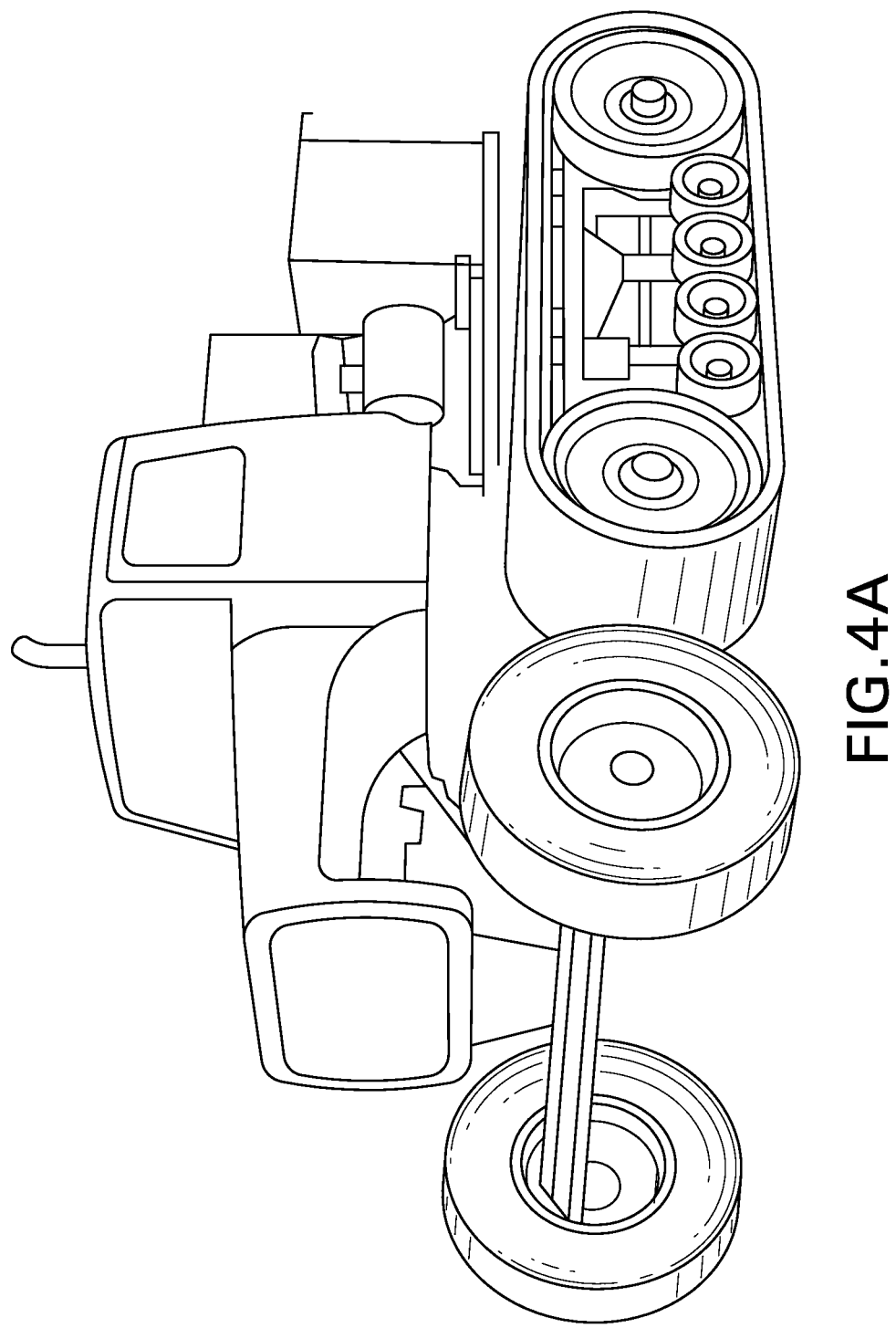
FIG. 4A presents a left front-side photographic view of an experimental tractor illustrating features of the two-track tractor depicted in FIGS. 2 and 3.

FIG. 4A depicts a two track tractor of the invention including a wheel assembly 26 located in front of a pair of track assemblies 22. Each track assembly 22 is mounted on a pivot shaft (not clearly seen in FIG. 4) located half way between its front and rear spindles. A moment can be applied to the track assemblies around the pivot shaft using a hydraulic cylinder having a moment arm, which is the perpendicular distance from the direction of force to the pivot axis. In this case the direction of force is the centerline of the hydraulic cylinder.

Unlike a typical half-track vehicle, steering maneuvers are generated by forcing the two track assemblies 22 to travel at different speeds. The two un-powered tires of wheel assemblies 26 are turn-angle synchronized by the invention during steering maneuvers to angles that prevent the tires from skidding in the lateral direction.

Figure 4B:
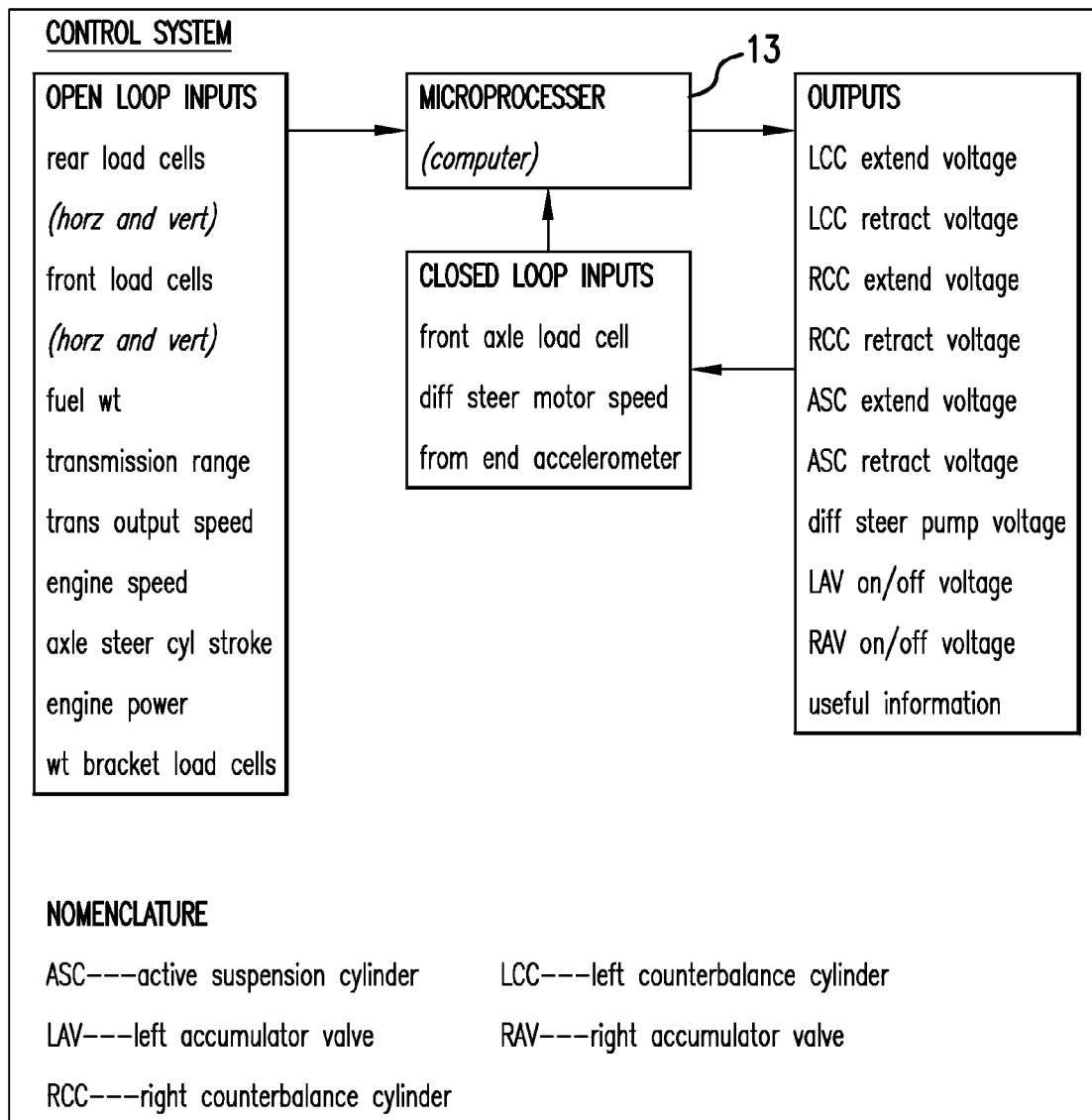
FIG. 4B depicts a control system of the invention.

FIG. 4B depicts a control system of the invention. Please note, however, that the elements comprising the control system could be modified. For example, the accelerometer in the feedback loop could be replaced by using the signal from the front axle load cell: causing some reduction in precision. Another example, there are several ways of determining the transmission output speed. For example, engine speed×transmission range ratio. The microprocessor would preferably be located in the cab of the tractor and have wiring harnesses transmitting input and output signals.

Figure 4C:
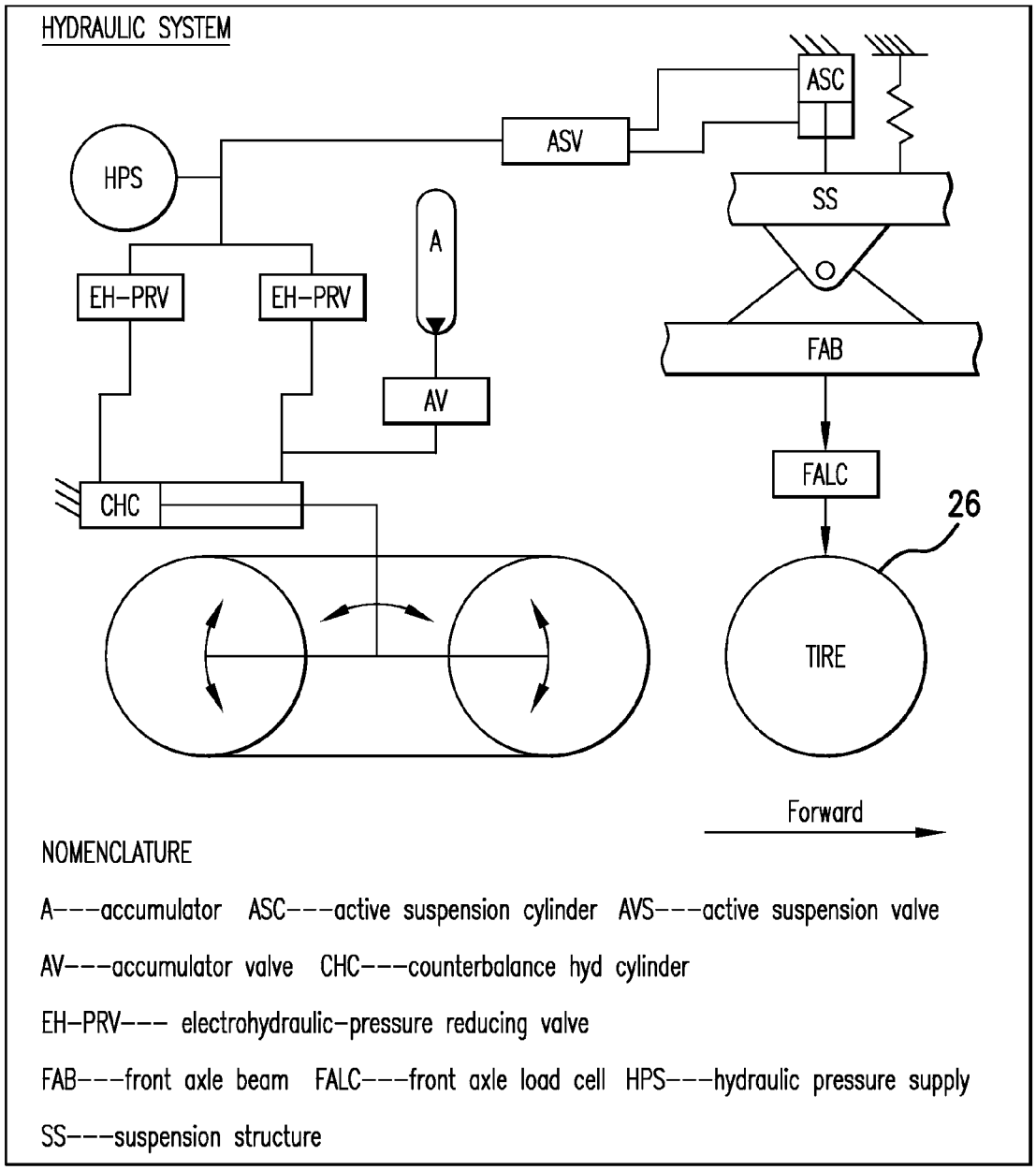
FIG. 4C depicts a hydraulic system schematic of the invention.

FIG. 4C depicts a hydraulic system schematic. Please note, however, that the elements comprising the control system could be modified. For example, the EH-PRV could be a different style of valve such as an electro hydraulic pressure relief valve. Preferably, the CHC, both EH-PRV, the AV, and the A are duplicated for each track assembly. Each side receives separate but identical output voltages from the microprocessor with one exception. During a pivot turn, or small radius turn in field mode, the inside track goes into road mode: reducing the load on the front of the inside track.

The signal to enter this mode comes from the steering wheel being rotated beyond a specified angle. Left or right rotation signals the correct track assembly to go into road mode. This has the net effect of reducing ground disturbance and reducing the track's lateral resistance to turning.

FIG. 4C is a preferred in the inventive apparatus and tractor because other components could be substituted. For example, the EH-PRV could be a different style of valve such as an electro hydraulic pressure relief valve. Preferably, the CHC, both EH-PRV, the AV, and the A are duplicated for each track assembly. Each side receives separate but identical output voltages from the microprocessor with one exception. During a pivot turn, or small radius turn in field mode, the inside track goes into road mode: reducing the load on the front of the inside track.

The signal to enter this mode comes from the steering wheel being rotated beyond a specified angle. Left or right rotation signals the correct track assembly to go into road mode. This has the net effect of reducing ground disturbance and reducing the track's lateral resistance to turning.

Figure 4D:
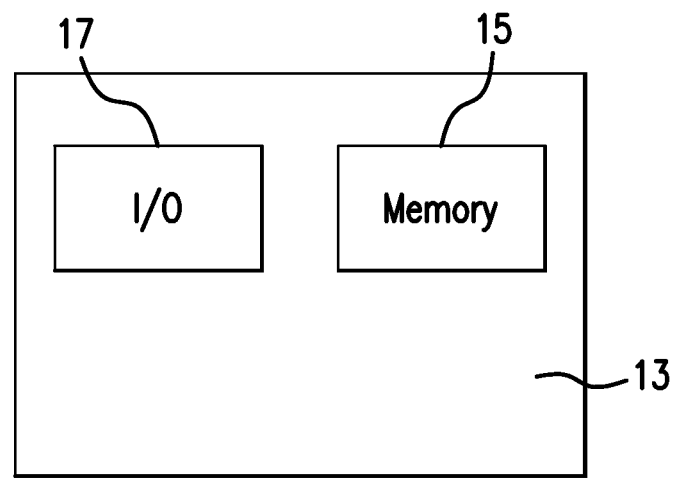
FIG. 4D depicts a microprocessor (computer), which is included as part of the control system.

FIG. 4D depicts a computer or microprocessor 13, which is included as part of the control system of the invention. The microprocessor includes at least a memory 15 for storing computer instructions and input/output elements/function 17. The computer or microprocessor may be installed anywhere in the tractor, for example, the computer may be under the hood in the engine compartment, under the dash in the driver compartment, in a door, etc. The computer receives and processes signals from sensors from the engine, from switches, like window switches, transmission selectors, even to detect movement on the accelerator pedal. The sensor outputs are used for many purposes including controlling various electrical valves, servos, etc., based on calculations made from the input from the sensors according to the software by which the computer is programmed (memory-stored).

FIG. 5 presents a view of the two-track tractor of the invention highlighting that track assemblies 22 are pivotally mounted to the center structure 23 of the tractor. For each track assembly 22, a hydraulic cylinder 25 is attached to the center structure 23 of the tractor and the other end of the cylinder to the track assembly 22. This forms a counterbalance moment mechanism.

The hydraulic cylinder 25 produces either a CW or CCW moment about the track assembly's mounting pivot 27. Wheel assembly 26 is mounted to the center structure 23 in front of the track assemblies. The rear drawbar 21A and 3-point hitch assembly 21B are connected to the center structure 23 through load cells 29, which are capable of measuring all rear implement loads applied to the center structure including horizontal loads, vertical loads, and moments. The load cells and hydraulic cylinders are part of a closed-loop, computer-controlled system (for example, the control system that controls ground pressure distribution under the track assemblies).

The front wheel assembly 26 reacts to the moments generated about the track assembly's mounting pivot. The front wheel assembly 26 is forced by a control system to carry heavy weight when traveling on a road.

Figure 6:
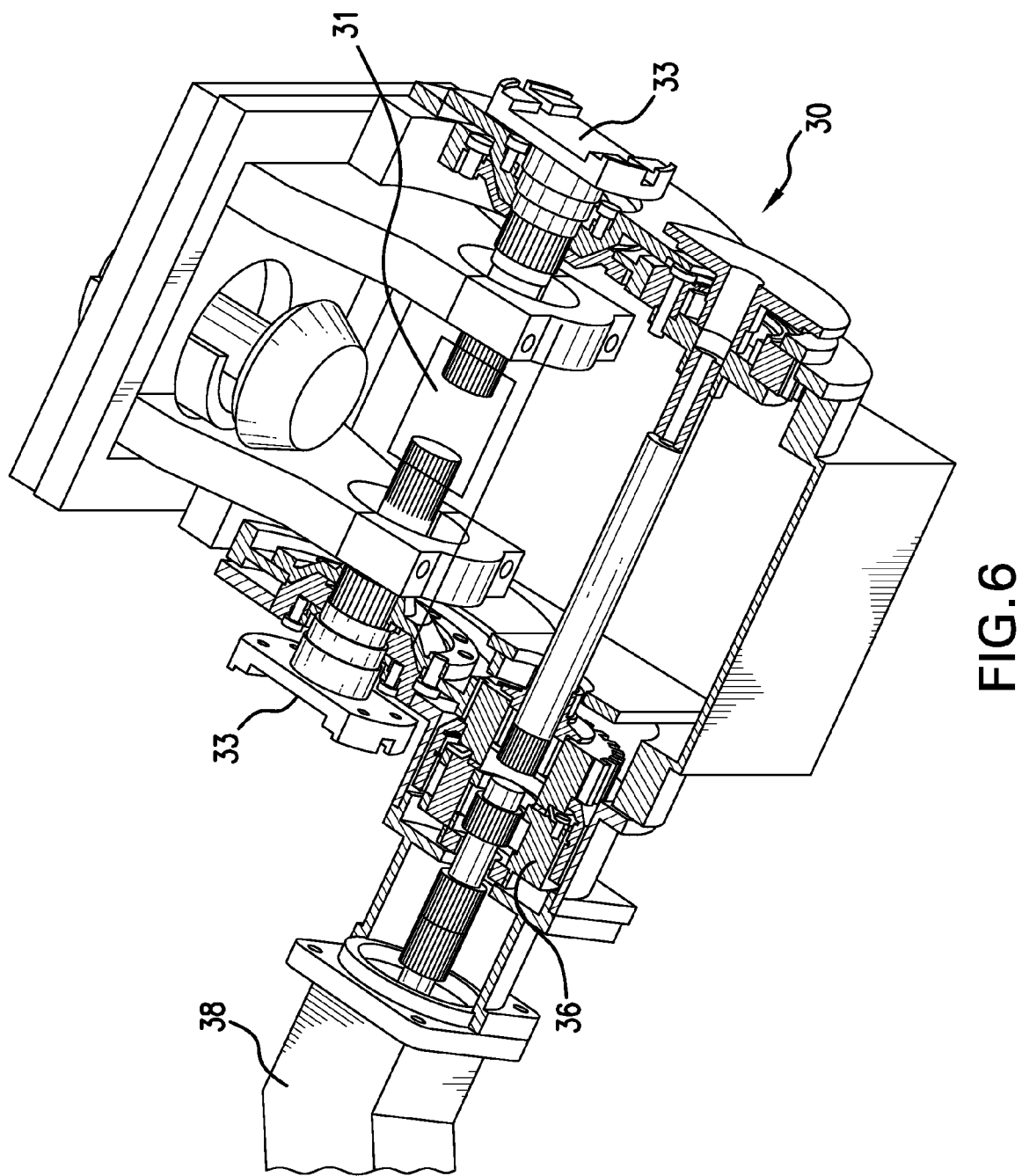
FIG. 6 depicts a primary steering system for use with the two-track tractor of the invention.

FIG. 6 depicts a primary steering system 30 for the two-track tractor of the present invention. The primary steering system 30 is commonly referred as differential steer and by its operation, forces the two track assemblies to travel at different speeds: causing the tractor to change directions of travel. A conventional spider gear differential 31 drives the two output shafts 33, each driving a track assembly (not shown in FIG. 6). A planetary gear system 36 is connected to the two output shafts as shown.

A steering motor 38 when rotating, forces a different speed onto each of the two track assemblies. The different track speed is proportional to motor speed and motor direction.

Figure 7:
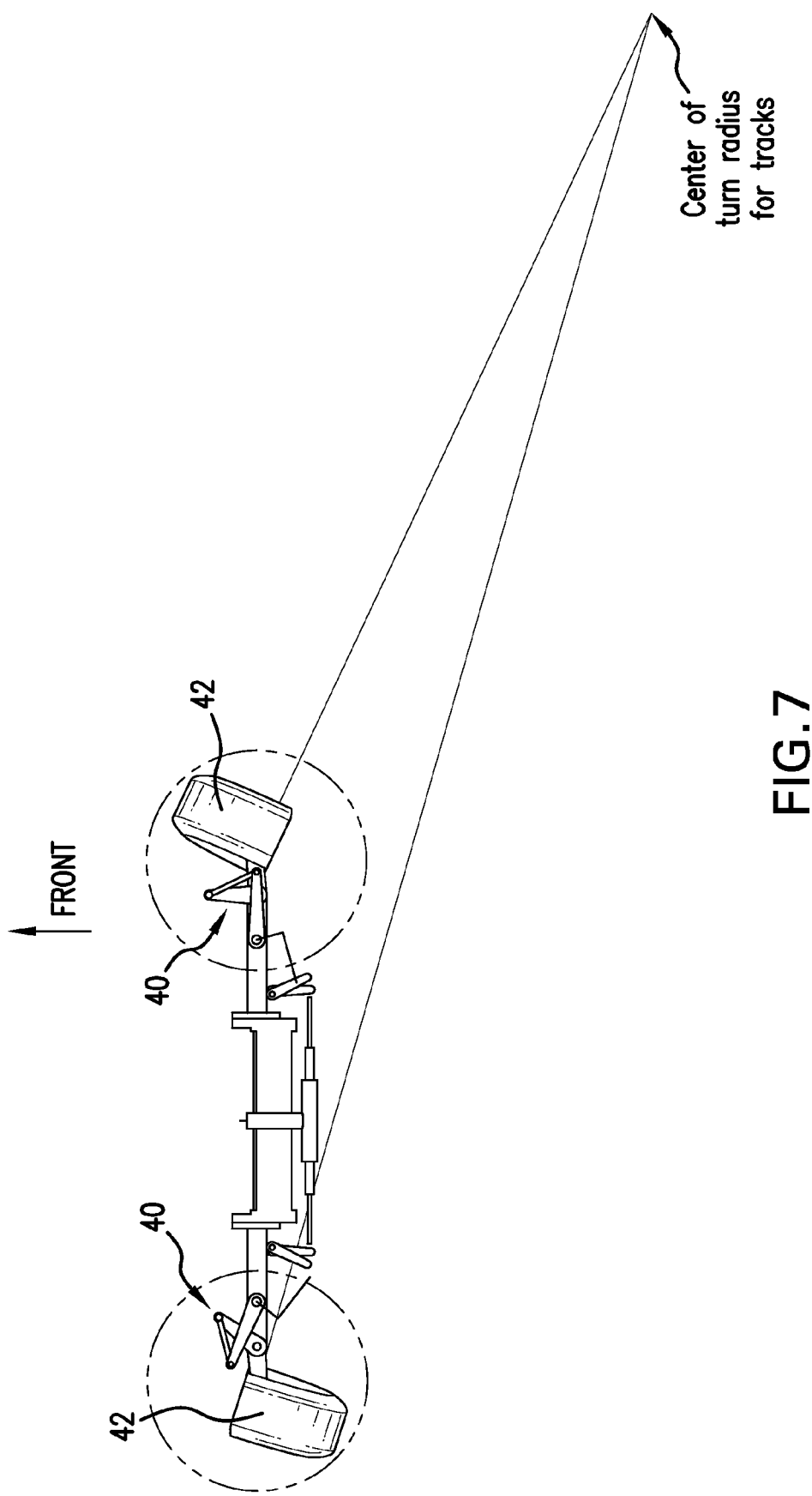
FIG. 7 depicts a wheel assembly of the two-track tractor in order to highlight turn angle geometry having correct alignment, as used in the inventive embodiments of FIGS. 2 and 3.

FIG. 7 depicts the front wheel assembly as an Ackerman steer system, which provides no steering force during fieldwork. Linkage geometry 40 is such that it provides proper tracking of the two wheels 42. An angle sensor (not shown) is used to help define the radius of the turn. The angle of the wheels is synchronized with track speed difference in a manner that prevents lateral skid of the front wheels (Diff steer motor speed=(constant A)×[tan(steer angle)]×(tractor speed)). Please note that there are many different types of angle sensors available. In the invention, it is preferred to have the angle sensor inside the steering hydraulic cylinder 46 (FIG. 8) for measuring the stroke of the cylinder from which steering angle can be calculated. Other inventive features or methods include but are not limited to sensors mounted on each wheel vertical pivot or the pitman arm.

A function of the wheel assembly 26 includes carrying weight when traveling on roads: significantly unloading the front of each track assembly. Another function of the wheel assembly includes stabilizing fore-aft pitch of the tractor. The front wheel assembly is always in contact with the ground. This prevents the front of the tractor from suddenly dropping down. The current two track tractor can do a "nose dive" when traversing a sharp ridge such as a terrace.

Figure 8:
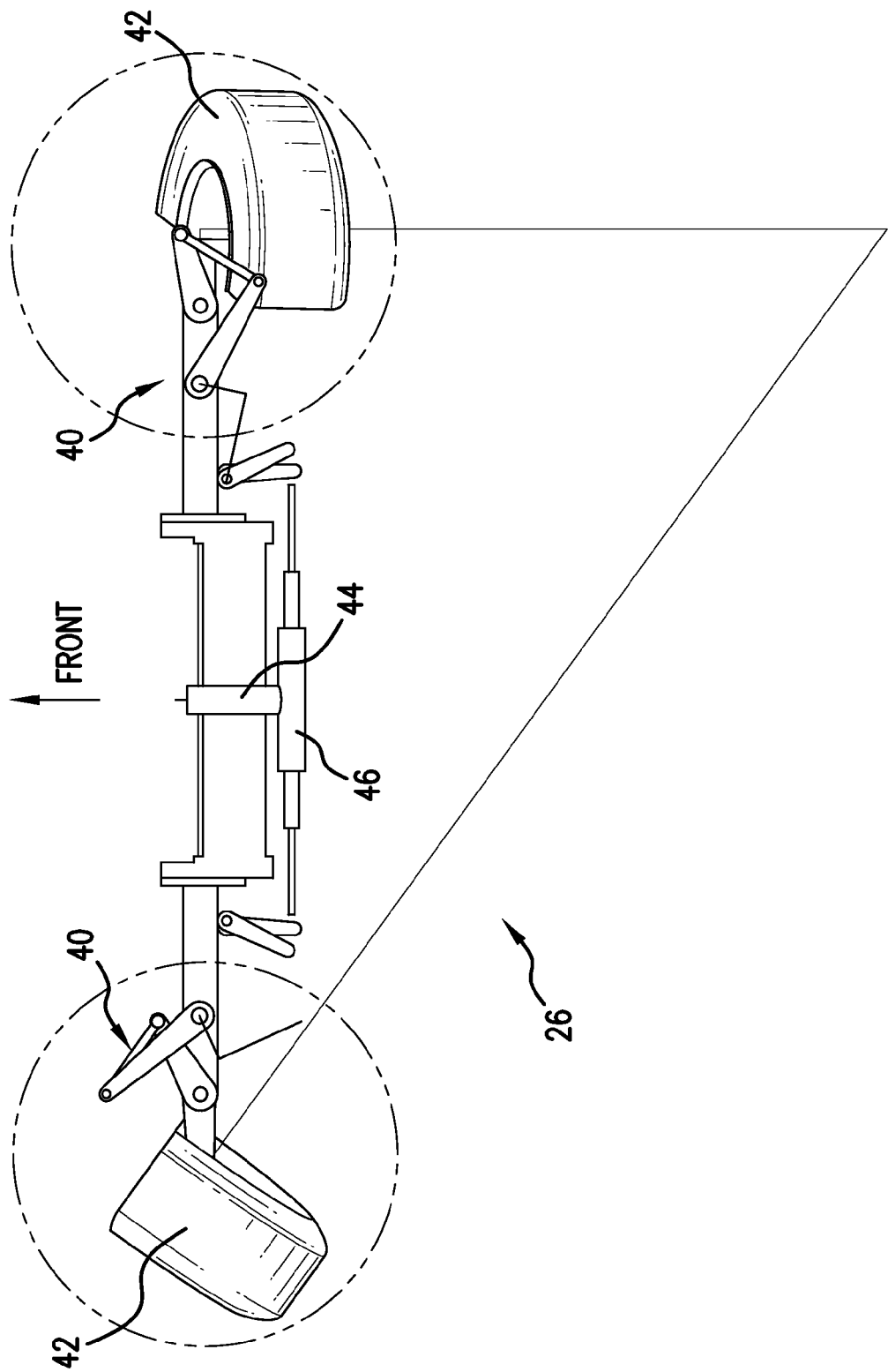
FIG. 8 depicts the wheel assembly of the inventive two-track tractor in order to highlight turn angle geometry having correct alignment for a pivot turn.

FIG. 8 highlights the linkage geometry (partially illustrated), which prevents front wheel lateral skid when the differential steer causes what is known in the art as a pivot turn. The ability to pivot turn has a performance advantage over conventional tractors using tires. A right pivot turn is illustrated where the right side track assembly has zero speed and the left track assembly is traveling either forwards or backwards.

The rolling centerline of each wheel 42 intersects at the center of the stopped track assembly 26 (see center pivot 44 and steering angle sensor inside steering cylinder 46). The wheel assembly 26 is attached to a suspension system (not shown) that is either passive or active or a combination of passive and active. Please note that the wheel on the inside of a pivot turn, turns at a greater angle than the outside wheel. If the reader imagines a sight line from the center of each wheel, where they intersect at the tip of the triangle is the center of the stopped inside track to avoid skidding the tires. The rolling centerline of a wheel is the axis of the spindle which is an imaginary line extending to infinity in both directions. Where the two axes intersect is the center of the Ackerman turn radius. The rolling centerline of the two track assemblies is the axis of the pivot shaft. The track speed difference defines the location of the turn radius; a point which lies on the axis of the pivot shaft. Synchronization occurs when the two axes of the Ackerman wheels insect at said point (see formula 1).

Figure 9:
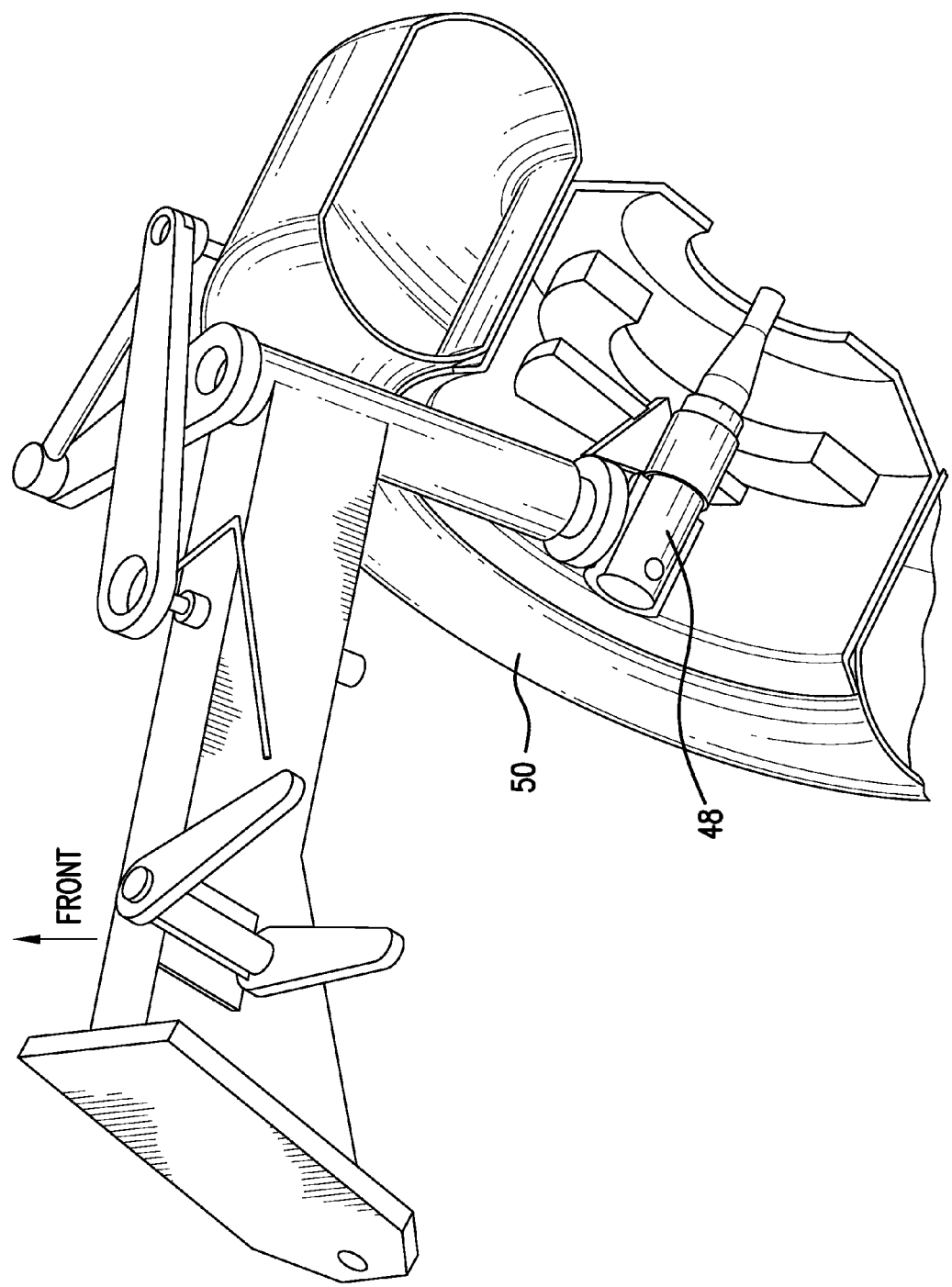
FIG. 9 highlights a view from the center looking forward and to the right of a portion of the wheel assembly of a two-track tractor of the embodiment of FIGS. 2 and 3.

FIG. 9 depicts how control system input regarding the amount 01 weight on the wheel assembly is generated. Load cell spindles, e.g., front axle load sensor 48 (see pneumatic tire suspension 50) are the preferred way to monitor weight on the wheel assembly 26.

Preferably, the wheel assembly 26 comprises a brake system matched to the weight it carries.

Figure 10:
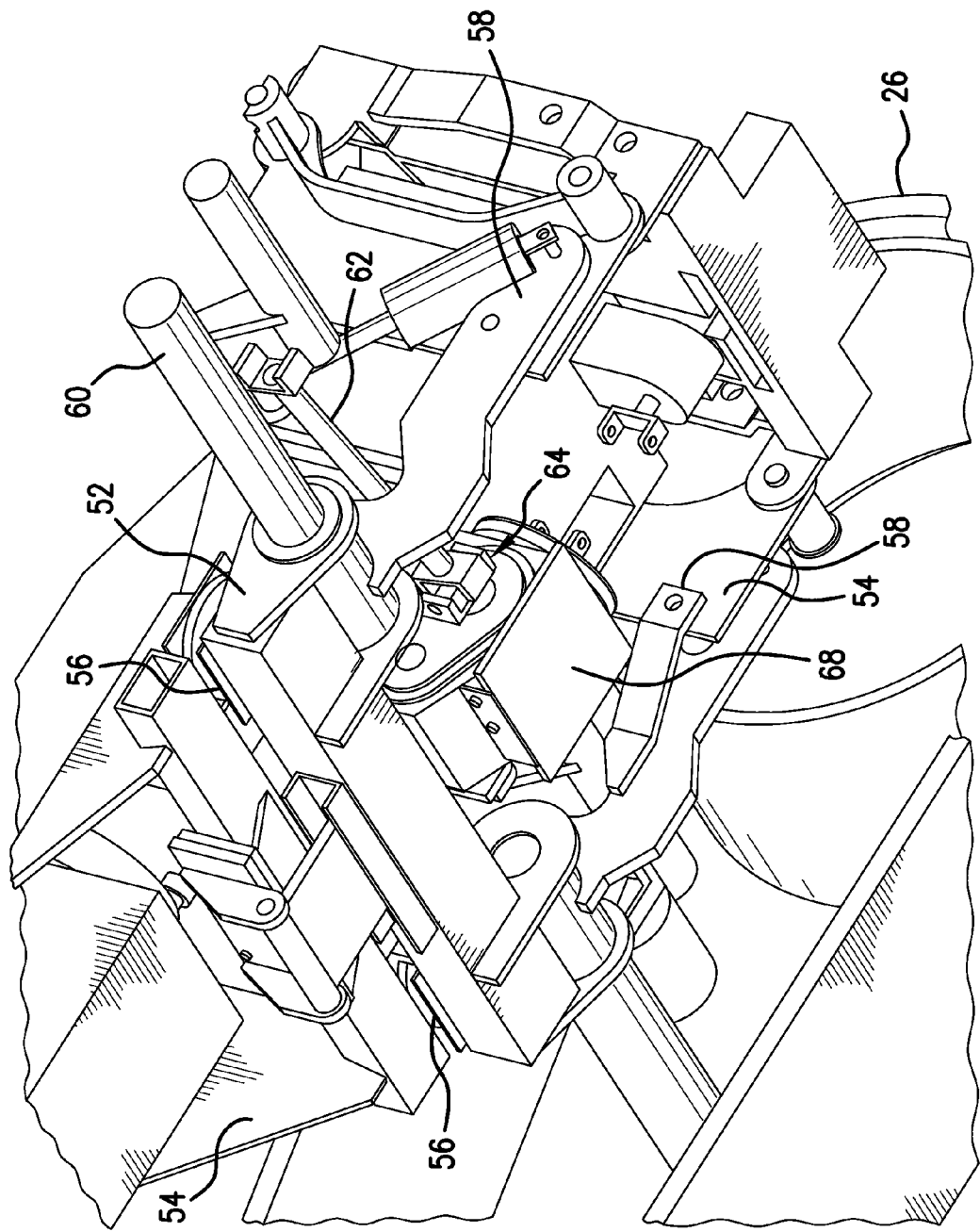
FIG. 10 depicts a bottom front left-side view of the embodiment of FIGS. 2 and 3.

FIG. 10 depicts highlights that a means of suspension 52 between the center frame 54 and the track assemblies 26 included in the center structure; The spring elements as shown comprise rubber pads 56, but the spring elements are not limited to such. The spring elements may comprise any spring elements known to the skilled artisan. The suspension illustrated is of the leading arm type having pivot joints 58 connecting the means of suspension 52 to the center frame.

Figure 11:
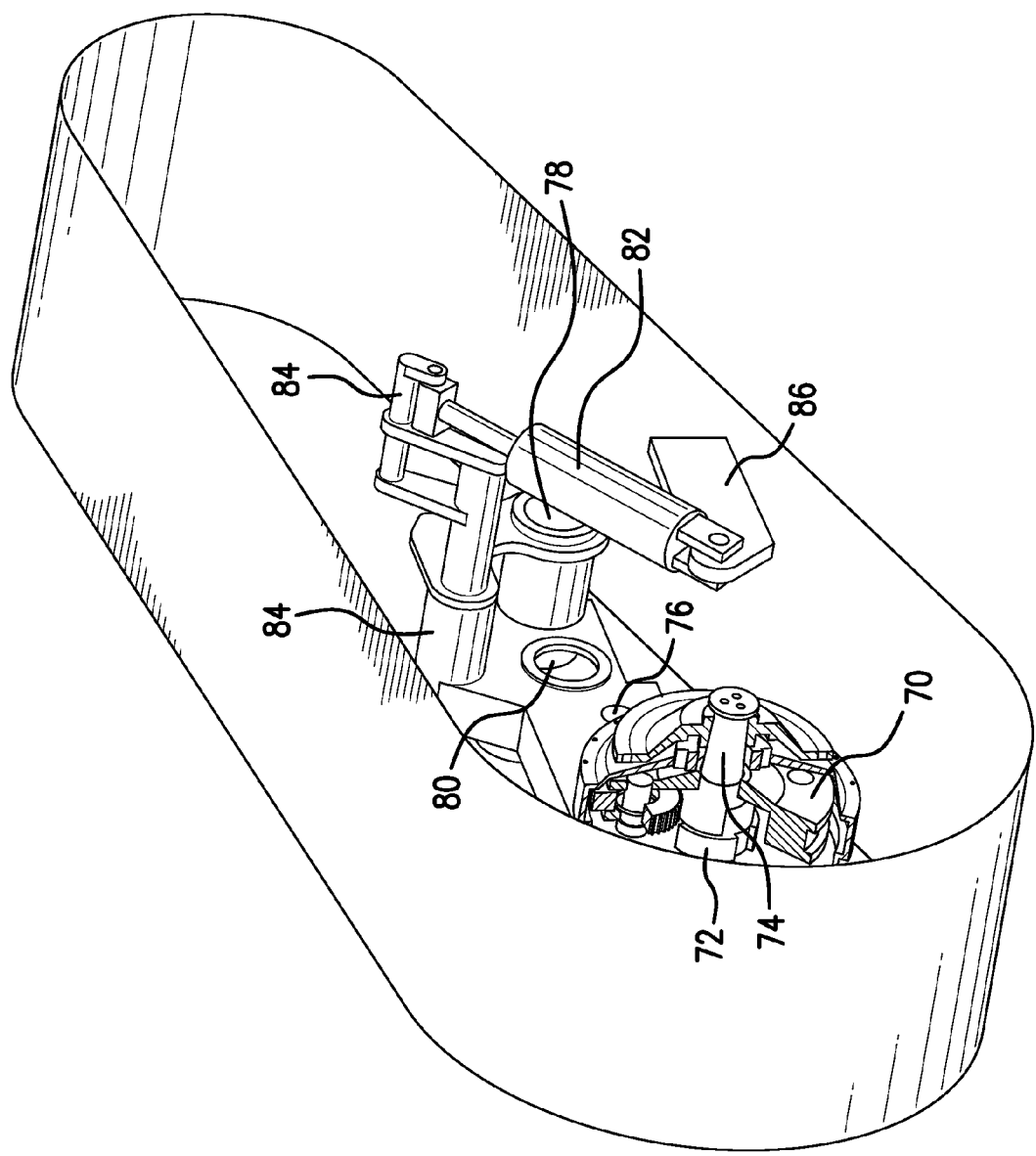
FIG. 11 depicts a top rear-side view from the center looking outward in the embodiment of FIGS. 2 and 3.

A second source of suspension is to selectively use an accumulator in the hydraulic circuit (FIG. 4C) that provides a counterbalance moment at the track assembly's pivot 60. Accumulators come many styles but are simply a chamber partially filled with a compressible gas, commonly nitrogen. As oil flows in an out of an accumulator, it compresses and de-compresses the nitrogen, acting like a compact spring. The accumulator can be mounted almost anywhere and connected to the hydraulic system as shown in FIG. 4C (item A). A simple valve (AV) can lock it in or out of a hydraulic system as needed. The accumulator can be positioned inside the pivot cylinder 82 (FIG. 11). A third source of suspension is to use pneumatic tires in the wheel assembly. A fourth source of suspension may be to provide internal suspension within each track assembly. A fifth source may be to provide suspension between the wheel assembly and the center frame 54. Centered in front of the track assembly's pivot shafts is a linkage (74, 84; FIG. 11) intended to take lateral forces without inhibiting vertical movements. The drive shafts 62 going out to the track assemblies are shown as having a pair of u-joints 64 that can tolerate the track assembly's oscillations and the suspension's movements.

The differential steering case 66 is shown in the center of the tractor and immediately behind the track assembly's 26 pivot bars 58. The differential steering assembly is driven as shown from the rear by an open drive shaft that is partly illustrated. Please recognize, however, that the transmission case and the differential steer case 68 need not be separate components.

FIG. 11 shows the final drive 70 located at the center of the track assembly's rear spindle 74. Preferably, the final drive 70 has a high reduction in order to keep the upstream drive train components small and light weight. Double reduction with an idler gear 76 is used in the illustration; see brake 72; main pivot 78; first reduction input 80; counterbalance cylinder 82; counterbalance mechanism 84; center frame 86. In the figure, the first reduction gearing is not shown. The first reduction gearing, using an idler, is commonly used.

Preferably, the track assembly's brake 72 is connected directly to the track assembly's rear spindle 74. For that matter, it also is preferred that the input drive shaft be located near the track assembly's main pivot 78 in order to keep the flexing of the input drive shaft 96 to a minimum.

The counterbalance moment mechanism 84 is illustrated. The hydraulic cylinder 82 is attached to the track assembly's frame 84 and to the center structure 86 in a manner that forms a lever arm.

Figure 12:
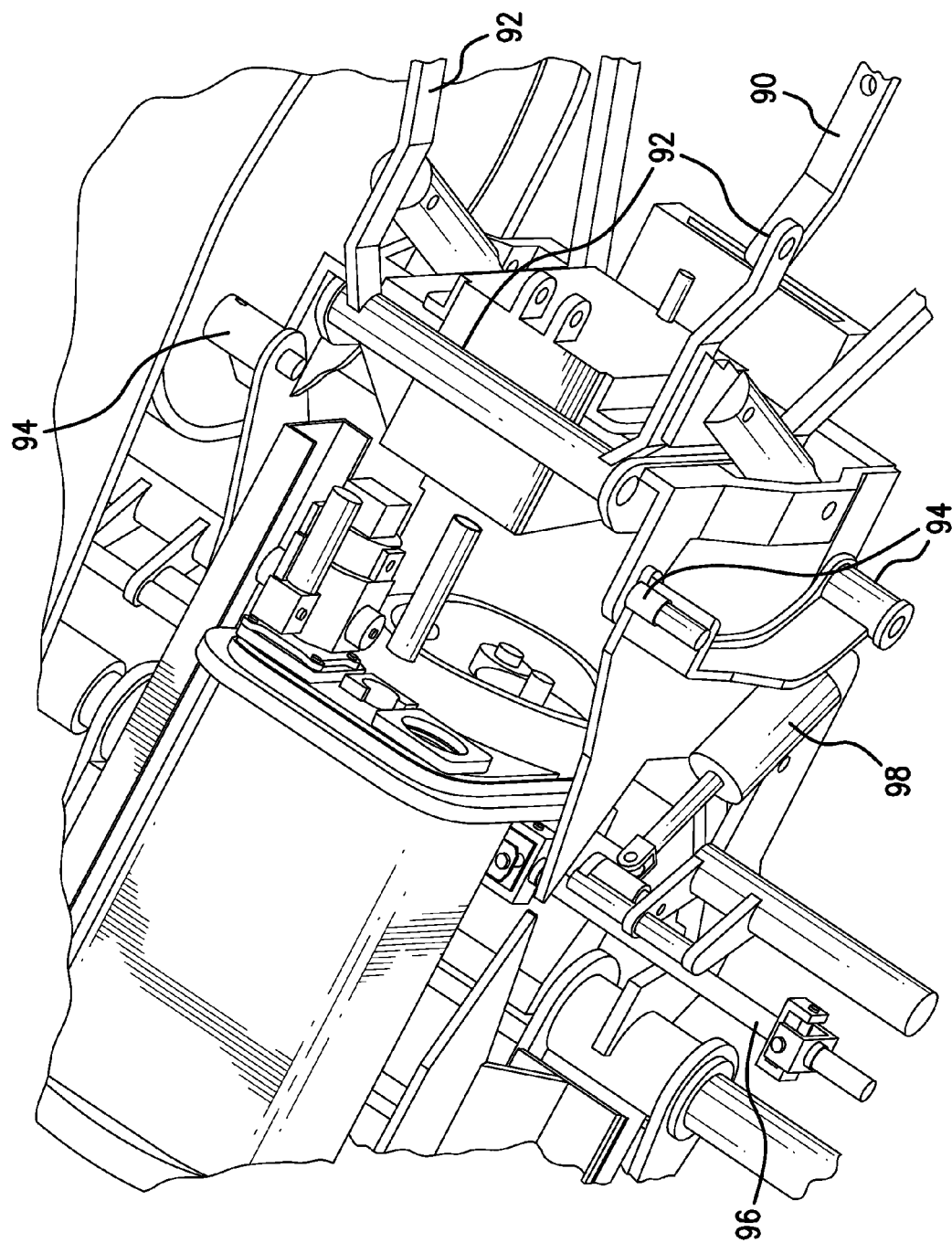
FIG. 12 presents a top left rear-side view of the embodiment of FIGS. 2 and 3.

FIG. 12 highlights the support structure 94 for the drawbar 90 and 3-point hitch 92 is mounted on electronic load cells 94 capable of inputting information defining horizontal loads, vertical loads, and moments produced by the implement; see drive shaft 96 and counterbalance cylinder 98.

Basic Formulas

1. Diff steer motor speed=(constant A)×[tan(steer angle)]×(tractor speed)
2. Summation of moments about the track's pivot centerline=zero
3. Summation of forces in the horizontal direction=zero
4. Summation of forces in the vertical direction=zero
5. Cylinder force=pressure×(cylinder area)
6. Pressure=(applied voltage)×(EHPRV calibration factor)
7. Moment=force×(moment arm length)
8. Fuel weight=conversion equation×fuel gage voltage output
9. (moment arm length for tractive forces)=(height of pivot shaft above ground+3 cm allowance for tread bar penetration into the ground)
10. (counterbalance moment generated)=(hydraulic pressure)×(cylinder area)×(counter balance moment arm length)
11. Track load profile equation $P=(aL^2+bL+c)$ (variable number calculated using the summation of moments equation and summation of vertical forces equation)
12. Calibration formula converting steering cylinder position to steer angle Formula is the basis for synchronizing the diff steer and the front wheel steer. Constant A is based on fixed gear ratios within the diff steer and final drive, fixed track driver diameter, fixed wheel base of tractor and a fixed gage of tractor.

The operator selects the vehicle speed and turns the steering wheel to follow a path. The steering wheel steers the front wheel assembly in a conventional manner. From this, the control system receives a steer angle input and a vehicle speed input and calculates the required diff steer motor speed.

This steering maneuver tells the control system's microprocessor to produce the calculated diff steer motor speed. The microprocessor is programmed to accomplish this by initiating an increasing voltage to the diff steer pump. The diff steer motor speed is in a closed loop circuit allowing the microprocessor to iterate. The voltage rises until the desired diff steer motor speed is achieved.

Note that for steering the front wheels at zero tractor speed, the calculated diff steer motor speed is zero. This is desired for safety reasons and because operators are accustomed to turning the front wheel of vehicles when setting still and not experiencing any vehicle movement.

Formula 2 is satisfied by the load cells measuring forces in both the horizontal and vertical directions. The moment arms for both the horizontal forces and vertical forces of all load cell positions are known, fixed values. The base weight of tractor structure has a known, fixed moment arms. If the moment arm for the fuel weight is not a constant, then a formula for this moment arm can be developed and put into the control system's program.

Formula 3 is satisfied by all external horizontal loads applied to the tractor being transferred thru load cells.

Formula 4 is satisfied by all variable vertical loads being measures by load cells and the fuel gage.

Formula 6 is satisfied by knowing the voltage versus pressure data for the pressure reducing valve: EH-PRV.

Formula 8 is satisfied using a fuel gage calibrated for the shape of the fuel tank.

Maintaining uniform ground pressure under the tracks is challenging. If the track's pivot is centered horizontally between the idler and driver, vertical loads on the pivot will be uniformly distributed under the tracks. Tractive forces generated at the ground will create a moment about the track pivot.

Please note that as used herein, moment arm length for tractive forces=height of pivot shaft above ground+3 cm allowance for tread bar penetration into the ground; tractive force required=(sum of horizontal loads detected by front and rear hitch load sensors)+(tractor weight+fuel weight+operator); track moment={(height of pivot shaft above ground+3 cm allowance for tread bar penetration into the ground)}× {(sum of horizontal loads detected by front and rear hitch load sensors)+(tractor weight+fuel weight+operator)×tan(fore-aft terrain slope angle)}; counterbalance moment=(−1)×(track moment); counterbalance moment=(hydraulic(hydraulic) pressure)×(cylinder area)×(counter balance moment arm length)=(hydraulic pressure)×(constantE)×(cylinder area).

If the counter balance moment is computed to be negative, i.e., the hydraulic cylinder is pressurized to pull, the cylinder area will need a component subtracting the rod area. This will be the case when carrying the front idler and carrying the rear implement on the 3-point hitch.

When a front end loader is used, the front mount of the loader should be attached to the front structure containing the 3-point hitch load sensors. The loader's rear mount should be a horizontal slip joint. This will allow the load sensors to report the loader's horizontal force. The payload could be reported to the computer using the loader's geometry.

Overriding the uniform ground pressure mode is now explained. Maintaining uniform ground pressure under the tracks needs to be overridden if the front axle load approaches zero. This could happen if the front counterweight is insufficient. Therefore, for front axle loads under about 75 kg per tire, the front axle load sensor in the wheel spindle needs to control and adjust the counterbalance moment mechanism's pressure in a way that keeps the load on the front axle above zero. As used, delta pressure=(−1)×(constantF)× $[(75-\text{load})]^2$, i.e. for positive values of (75−load) averaged for the past few second of time.

The available delta pressure is about 30000 kpa, derived from 15000 kpa push to 15000 kpa pull. If this override mode persists, a message should be sent to the operator's monitor suggesting an amount of counterweight to add to the front of the tractor.

The main math equation used in the control system, which may simply comprises microprocessor 13 shown in FIG. 4D, programmed to implement the inventive balancing, is the summation of moments about the track assembly's pivot is equal to zero. Each track assembly receives an appropriate counterbalance moment, determined by the control system, applied by a hydraulic cylinder 98. The control system receives inputs, calculates, and outputs the appropriate pressure and direction for the counterbalance moment.

Different modes, such as field mode or road travel mode, use different inputs for the control system's program. Other math equations used in the control system include the summation of forces in the vertical direction equal zero, the summation of forces in the horizontal direction moment equal zero, a weight profile equation that describes the weight under each of the track assembly's spindles.

The magnitude of the counterbalance moment and the drawbar loads front and rear directly affects the weight under the track assembly's spindles. The sum of the weights on the driver, idler, mid-rollers and wheel assembly must equal the total weight of the tractor and carried implements. These measured or known values, in turn, allows a low or zero calculated resulting weight on the front idler to be a controlling factor during road travel mode.

In more detail, the control system's microprocessor first computes the counterbalance moment for applying a uniform load under the tracks for the real time situation. A road travel real time situation might vary from carrying loads front and/or rear. The real time situation might vary from a heavy wagon pulling or pushing on the drawbar or no loads at all. The control system can compute, in real time, a counterbalance moment for a uniform load distribution for any real time situation for road travel mode.

To the real time uniform load calculation, the microprocessor will be instructed, in road mode, within its program, to add an unbalance moment. The microprocessor will use the load profile equation 11. In equation 11, L is the distance forward from the rear spindle of the track assembly. If the track assembly has 4 spindles (for example), the L value of each spindle is a known, fixed value and the moment arm of each spindle about the track assembly's pivot axis is a known, fixed value.

Therefore, there would be a calculation for P (vertical load) done using $L_1$, $L_2$, $L_3$, and $L_4$: producing a $P_1$, $P_2$, $P_3$, and $P_4$. In step −1., $P_1$, $P_2$, $P_3$, and $P_4$ have identical, known load values i.e. uniform load distribution, the sum of $P_1$, $P_2$, $P_3$, and $P_4$ is a real time known value.

The microprocessor adds an unbalance moment at a prescribed rate of increase. The process of adding the unbalance moment does not change the known sum of $P_1$, $P_2$, $P_3$, and $P_4$. This allows the different values of $P_1$, $P_2$, $P_3$, and $P_4$ to be given load values during the unbalance. $P_4$ is the load on the front spindle and is the target load to be maintained in road travel mode. This target load is a constant put into the microprocessor's program. $P_4$ is in the feedback loop and is used to stop the addition of an unbalance moment i.e. $P_4$ is the controlling force for adding the unbalance moment.

The microprocessor maintains an unbalance moment that satisfied the constant assigned to $P_4$ during road travel mode. Most road surfaces have both concave and convex profiles. Therefore, maintaining $P_4$ within an allowed tolerance is a dynamic, iteration process. This means the microprocessor adds and subtracts the amount of unbalance moment in real time. The inputs from momentary road bumps and potholes are allowed to be disregarded i.e. average the affected inputs.

Figure 13:
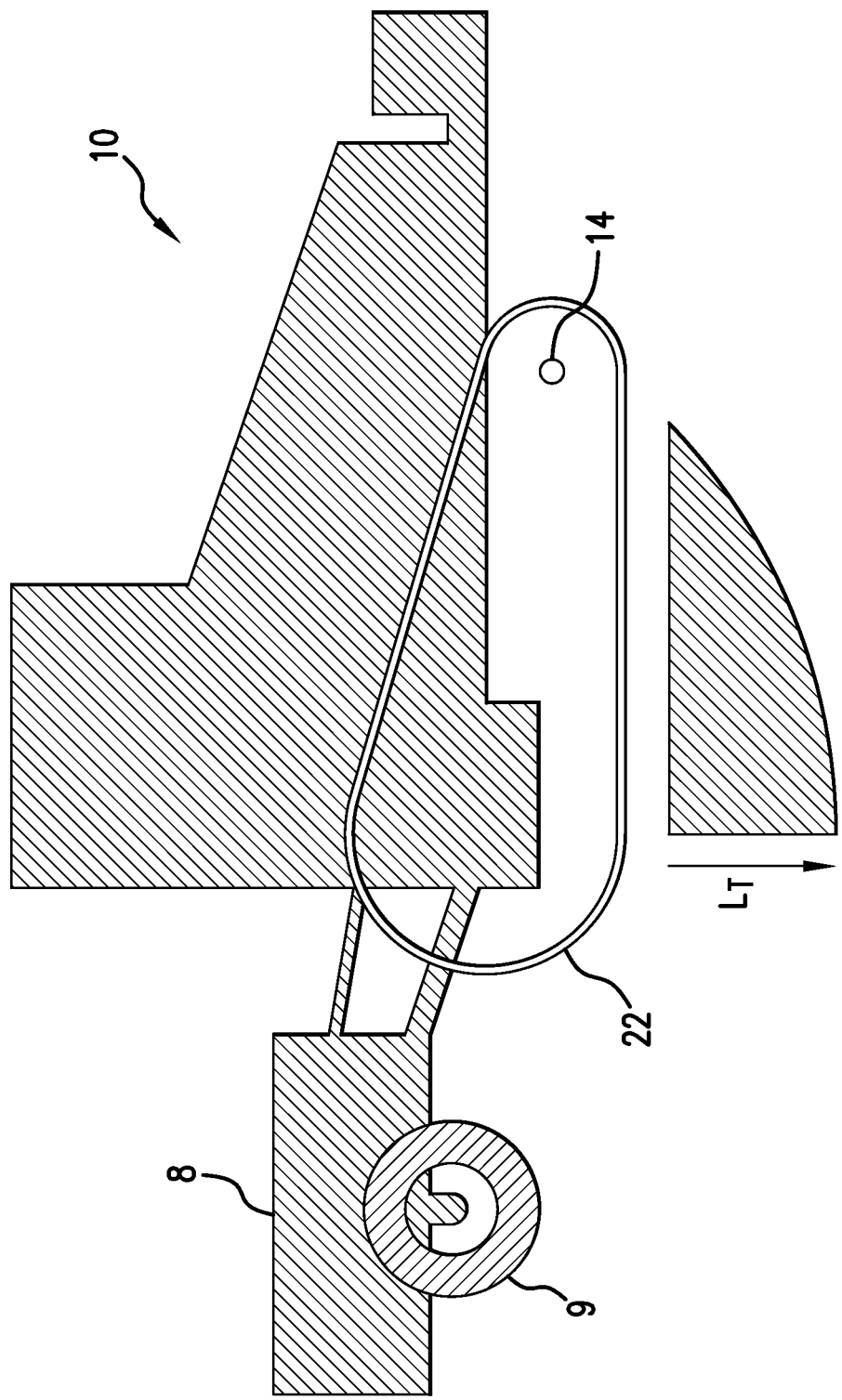
FIG. 13 presents a right-side view of a conventional two-track tractor when carrying a rear mounted implement (Prior Art)

FIG. 13 highlights a standard two-track tractor 10 carrying a 3-point mounted implement 8. When the implement 8 is lowered, the ground supports the implement, significantly changing the weight (i.e., load profile ($L_T$)) on the track assembly's front spindles, as shown. The implement's gage wheels 9 carry the weight of the implement 8 during field travel. For the static situation illustrated, picking up the 3-point weight causes the weight on the track assembly's 22 front spindles 14A to change from a heavy weight to near no weight.

A front counterweight is too light for safe road travel. The situation illustrated is likely to become unstable at high speeds during road travel. A step bump, for example, can initiate a severe, backward and forward, pitching condition: compromising the control of the tractor. Under certain conditions, a 100 mm high step bump and having no rear suspension, computer analysis indicates that at typical road speeds, the standard configuration two-track tractor raises completely off the ground.

Figure 14:
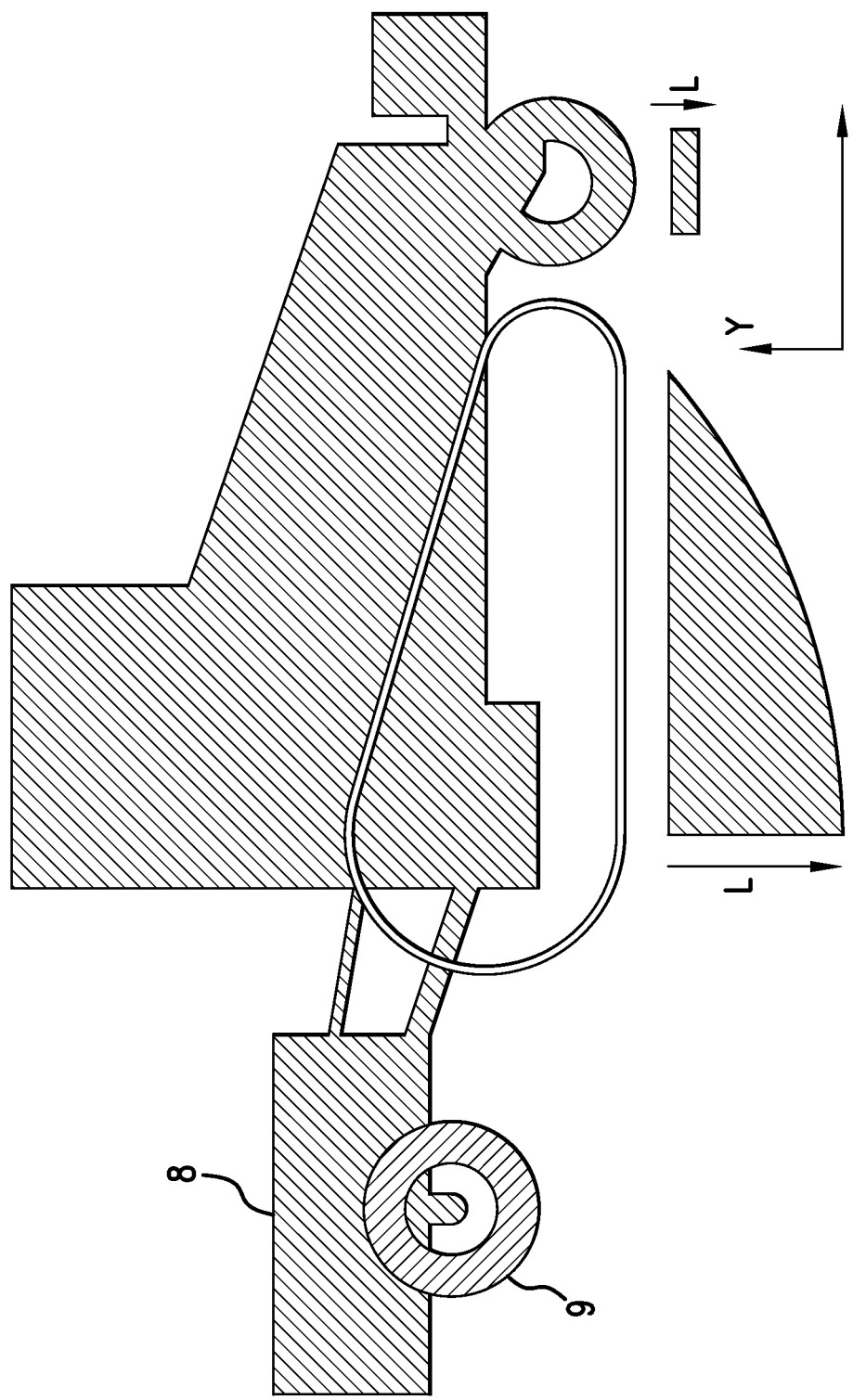
FIG. 14 presents a right-side view of the two-track tractor of the embodiment of FIGS. 2 and 3, and weight profile, when carrying a rear mounted implement.

FIG. 14 highlights 3-point weight completely picked up by us of the embodiment of the invention depicted in FIGS. 2 and 3 and described in detail herein. In the figure, $y=(ax^2+bx+c)\times$ (variable). When the implement 8 is lowered and working, the ground supports the implement's weight. Specifically, the implement's gage wheels carry the weight of the implement during fieldwork.

The control system continually checks for safe operation. The control system manages the situation for both field mode and road travel mode. For field mode and picking up the weight of the implement, a minimum weight is kept on the wheel assembly, and the track assembly's front spindle's weight is reduced as needed.

For field mode and weight pickup, if the control system calculates the track assembly's front spindle weight carried as negative, information is flashed onto the operator's monitor stating the minimum amount of front counterweight that should be added. For road travel mode and using the counterbalance moment mechanism, the control system insures a minimum weight on the wheel assembly that is needed for safe operation.

As the two-track tractor of the invention has two steering systems that supplement each other if one fails or is degraded, without the additional cost that the standard two-track configurations require. If the differential steer should fail, the front wheels still maintain control of the tractor to bring it to a safe stop or a limp home mode. If a front tire should go flat or otherwise fail, the diff steer maintains control for a safe stop.

Figure 15:
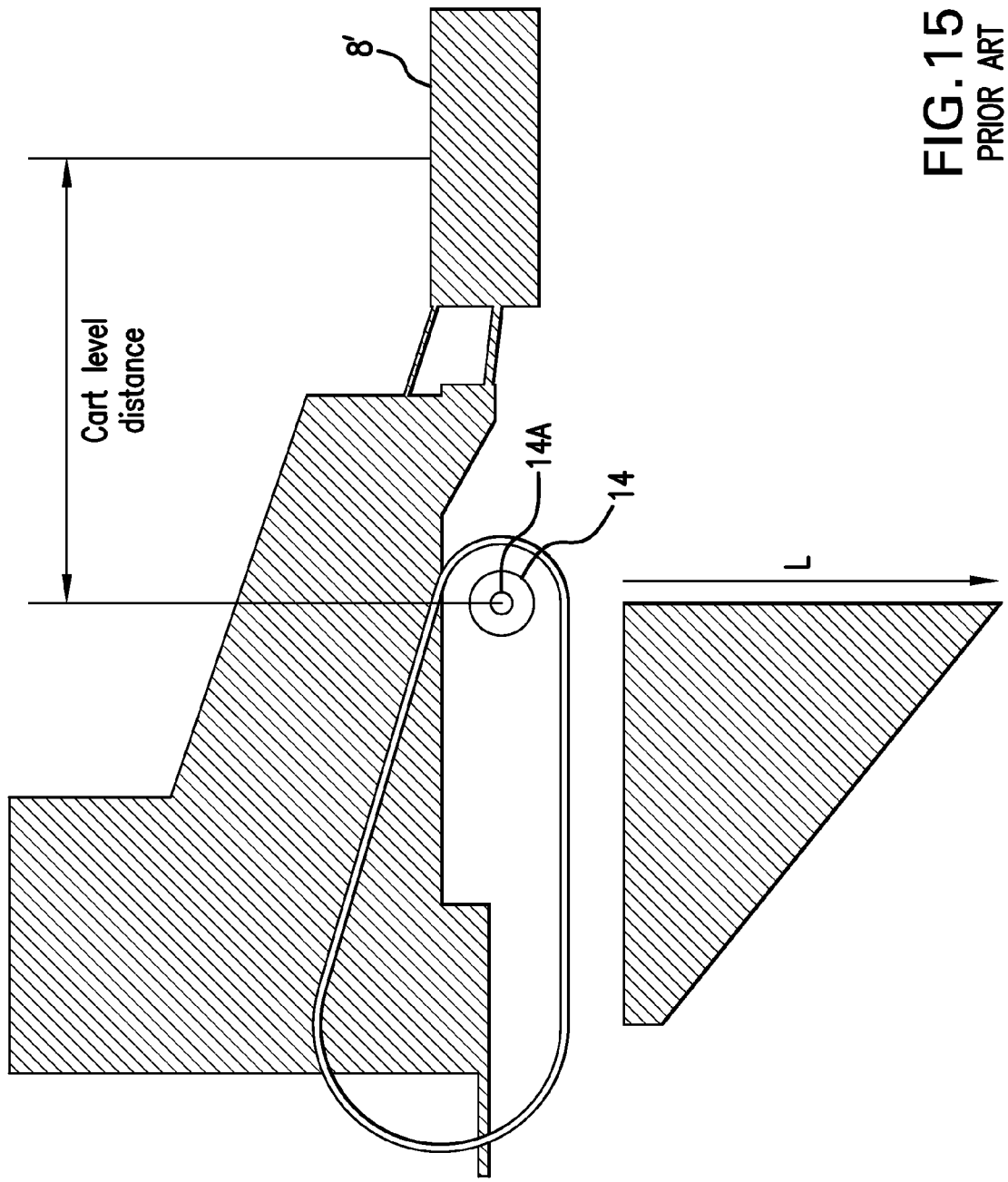
FIG. 15 presents a right-side view of a conventional two-track tractor carrying a front mounted implement (Prior Art)

FIG. 15 depicts a standard two-track tractor with a front-mounted implement 8'. The reader should note that even though some front-mounted implements have gage wheels, the implement is typically picked up for road travel. The tipping fulcrum is the track assembly's front idler 14. The cantilever distance of the front-mounted implement 8', measured from the front idler's spindles is large because the standard two-track tractor tends to have an extended nose: The weight 8' carried at the front of the track assembly is large when gage wheels are carried.

As used herein, large means heavy, i.e., a lot of pounds such as 2000. 3-point hitches have some of the characteristics of parallelogram linkages. When the upper link is parallel to the lower two links, the 3-point hitch is an exact parallelogram linkage. For this situation and if the lift capacity of the 3-point hitch is 10 ton for example, the hitch can lift a 10 ton implement regardless of how far removed from the fulcrum the CG of the implement is.

Pry bars work on the principle of creating large forces at the fulcrum by applying a small force at the end of a long handle. Certain implements (for example plows) attached to a 3-point, parallelogram hitch can have the effect of a long handle pry bar. For FIG. 15, the front idler 14 is the fulcrum and may have to carry a load several times the weight of the implement.

For road travel, this invention puts this heavy load on tires having tread patterns designed to carry heavy load without vibrating and without rapid wear rates. Belt wear during road travel is proportional to the amount of weight carried at the front idlers 14.

Vibrations induced under the front idlers 14 have high amplitudes. High amplitude vibrations are cyclic. The accompanying forces are cyclic and the movement of the mass is cyclic. For vibrations, this can have reference to generating a large peak force or to moving a large distance to the ends of the vibration's stroke.

Figure 16:
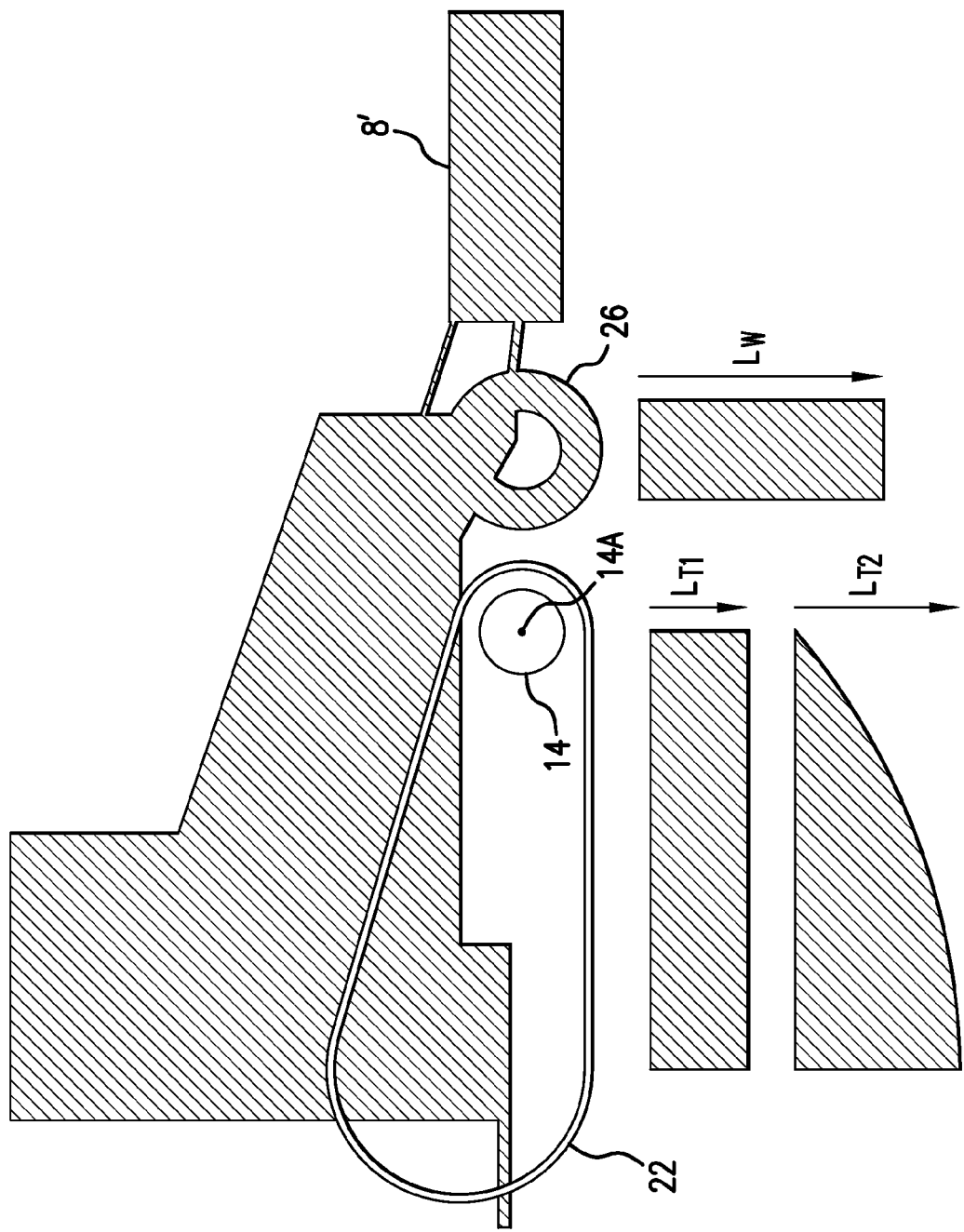
FIG. 16 presents a right-side view of the two-track tractor of the embodiment of FIGS. 2 and 3, and weight profile, when carrying a front mounted implement.

FIG. 16 presents an embodiment of a two-track tractor of the invention including a front-mounted implement 8'. The tipping fulcrum 14A in the inventive apparatus or tractor is the front tire spindle 26. The cantilever distance of the front-mounted implement is reduced, as shown. The track assembly 22 does not carry the front-mounted implement 8'. The wheel assembly carries weight as needed. The weight profiles (or load (L)) under the track assemblies 26 are shown.

For fieldwork, the control system maintains a uniform distribution. For road travel, the weight carried at the front idler 14 is reduced in order to prevent the creation of vibrations and to keep belt wear to a minimum.

The control system comprises dedicated or shared sensors to input the following:

rear drawbar and 3-point loads—vertical, horizontal, and moment Front drawbar and front 3-point loads—vertical, horizontal, and moment;

wheel assembly weight carried;

wheel assembly turn angle;

the operator's steering wheel angles the wheel assembly: using modified variable rate steering technology because the tire at the inside of the turn needs to be able to quickly go to a 90 degree angle;

the turn angle of the wheel assembly, and vehicle speed, are variables used to determine the differential steering motor's rpm and direction;

differential steer motor rpm and direction of rotation;

transmission output speed;

weight of fuel—calculated from fuel gage information;

mode of operation—such as field work, road travel, front end loader, etc; and wheel assembly active suspension accelerometer.

The invention includes or operates with a plurality of constants needed by the control system shown in the following:

all lever lengths from all the load cells to the track assembly's pivot;

lever length of the counterbalance moment mechanism's cylinder;

lever length of the fuel load to the track assembly's pivot;

shipping weight and Center of Gravity (CG) of the tractor's center portion;

shipping weight and CG of the track assemblies;

location of the track assembly's pivot from front and rear spindles—horizontal and vertical;

differential steer constant—motor speed to track speed difference;

fore-aft distance from track assembly's pivot to wheel assembly centerline;

weight and CG of the wheel assembly.

Shipping weights and horizontal centers of gravity have a role in preventing the front of the track assemblies from rising off the ground during road travel mode. The summation of moments around the track assembly's pivot equal zero equation needs to know the shipping weights and the horizontal centers of gravity.

The control system provides output signals for the following:

the correct pressure and direction for the counterbalance moment mechanism's left and right side cylinders;

the correct speed and direction of the steering motor, which synchronizes the wheel assembly's turn angle and the track speed difference;

signals and warnings to the operator's monitor telling the preferred amount of counter weights to add or remove, including the control system maintaining a load histogram for the past several minutes or hours;

certain override signals in view of the fact that the primary mode for fieldwork is to maintain uniform ground pressure distribution under the tracks, where too little weight on the wheel assembly must result in generation of an override signal in order to keep the wheel assembly on the ground. Likely sources that produce an override signal include a cantilevered 3-point mounted implement in raised position, not enough counterweight, etc.

In override mode, the wheel assembly's weight sensor becomes the controlling sensor that the control system responds to.

As stated, the invention includes means functioning as levers to place more weight on the front track spindles would cause the laws of physics to reduce the weight on the front wheel. In the invention, these two levers are moved with hydraulic cylinders to cause the front wheel assembly's load to vary. The two levers and the two hydraulic cylinders operate as the counterbalance moment mechanism. The two levers are an integral part of the track assembly's frame structure. This mechanism is preferably positioned near the back or the tractor just as the wheelbarrow handles are at the back: away from the front wheel.

In the invention, the primary means are: 1. the track assembly's pivot shaft, 2. the counterbalance moment mechanism, and 3. the control system, which together operate to remove most of the weight on the track assembly's front spindles during road travel and to counterbalance moment mechanism's cylinders reacting appropriately to loads applied to the tractor that are parallel to the ground. Load cells provide input to the control system in order to define the resultant magnitude of this parallel load.

Traction force, equal to the magnitude of this load, is applied parallel to the ground and at ground level by the interaction of the track assembly's tread-bars and the ground.

The natural result of the track assembly's elevated pivot centerline above the ground is this. There is an overturning moment applied at the track assembly's pivot when parallel loads, such as drawbar pull, are experienced. This traction-induced overturning moment disrupts the desired uniform ground pressure distribution under the tracks. The law of equal and opposite forces helps make the magnitude of the overturning moment known. The control system applies a counterbalance moment resulting in the ground pressure under the tracks being uniform.

The control system, FIG. 4B, insures that the wheel assembly's tires always remain in contact with the ground. The weight sensor in the wheel assembly monitors the weight and if the weight approaches zero, the weight sensor signals the control system to go into override mode. The physical components of the control system are not shown except for part of the load cells. The workings of the control system are already described in detail. The microprocessor and wiring harnesses are common components. Override mode causes the torque of the counterbalance moment mechanism to bias weight off the front of the track assemblies and onto the back of the track assemblies. The net result of this is a downward, reactionary force or Load (L) onto the wheel assembly, as shown in the figures.

During fieldwork, all tractors generally encounter obstacles and situations, which can be categorized or are a result of the ground's surface texture and the ground's terrain features. Typical terrain features include terraces and waterways. The standard two-track tractor tends to pitch forward violently when traversing the abrupt convex ridges of such features, which can be both dangerous and uncomfortable for the operator and may cause high stress on some of the tractor's components. The inventive two-track tractor keeps the wheel assembly in contact with the ground at all times avoids violent or uncomfortable pitching of the tractor and makes the ride smoother. The inventive two-track tractor requires less heavy structure at the rear: moving the center of gravity (CG) forward.

Conventional two-track tractors require heavy components located near the rear of the tractor for structural and functional reasons. But this large amount of weight at the rear of the vehicle is generally not favorable for providing a desirable center of gravity or balance for a tractor used primarily for towing loads, nor for carrying heavy implements at the rear of the tractor. To properly balance a tractor for towing and/or carrying rear weights, front counterweights are usually provided, but tend to make the tractor heavier than desired.

Ramifications of this extra weight include additional Rollover Protective Structures (ROPS) support, more cost, higher belt wear during road travel, more compaction, etc. It is common practice to leave the front counterweights in place during time spend traveling on roads. This often places the center of gravity forward of the preferred location for travel on roads; making the tractor nose-heavy.

In the inventive two-track tractor, when traveling on roads, the wheel assembly takes on a steering function because a significant amount of weight on the wheel assembly provides a significant amount of lateral traction when the tires are angled. Thus, changing directions during travel on roads is a combined effort of differential steer and the lateral force produced by the wheel assembly.

The inventive two-track tractor also is advantageous in that it provides an additional safety factor in certain situations. For example, a loaded wagon pushing the tractor down a hill may require braking forces that approach the maximum capability of the track's traction. Differential steering requires that the tracks exert traction in order to steer. During travel on the road, if any combination of situations exceeds the track assembly's traction capability, the wheel assembly's steering capability provides backup steering.

Referring back to FIG. 14 and the situation of carrying a heavy 3-point weight during road travel, the minimum weight, programmed into the control system, for the wheel assembly insures the wheel assembly can turn the tractor adequately for safe steering during road travel.

The inventive two-track tractor, as explained above, includes two steering systems. Differential steer is the primary system. While wheel assembly is included not for only steering, it does have Ackerman steer capabilities. One intended purpose of the wheel assembly is to carry the front of the track assemblies during road travel. Another purpose is to carry front-mounted implements. Another purpose is to reduce pitch. Another purpose of the wheel assembly is to be the reaction member that allows the counterbalance moment mechanism to provide uniform ground pressure.

As the wheel assembly carries a significant amount of weight during road travel, the lateral traction of the tires naturally provide a steering force. The wheel assembly is a back-up steering system for the tractor during road travel.

As shown in FIG. 10, the leading arm suspension system for the track assembly's pivot shaft serves as part of the suspension system package. The preferred wheels for the wheel assembly in front are a pair of pneumatic tires having suspension characteristics. The wheel assembly has a center pivot for lateral oscillation and a two-mode suspension system that attaches it to the center structure: active and passive (FIG. 4C (right side) highlights the front axle system).

Referring again to FIG. 13 and FIG. 14, the overall center of gravity is closer to the rear of the track assemblies when a weight is carried on the 3-point hitch. For the standard two-track tractor configuration (FIG. 13), this naturally causes the load on the rear spindles to increase. The natural fulcrum is the rear spindle. For the improved configuration, the natural fulcrum is the track assembly's pivot shaft: considerably forward of the rear spindle. For this reason, the load on the rear spindles in the inventive two-track tractor needs to increase in order absorb and prevent excessive front counterweights.

In the invention, a spring rate is added to the rear spindles of the track assemblies by inserting an accumulator into the hydraulic circuit of the counterbalance moment mechanism. Spring rate is the main characteristic of any suspension system that improves the quality of ride, as explained above. This arrangement allows the rear spindles of the track assemblies to have a low spring rate and to move/oscillate up and down relative to the tractor's center structure. Spring rate is the number of units of force it takes to compress a spring one unit of length.

Generally speaking, most common suspension systems are categorized as passive. The wheel assembly is up front and experiences "first encounter" of what the tractor is about to traverse. The ground's surface texture may vary from very smooth to close-spaced, hard chunks of soil brought to the surface for example by a ripper, to random erosion ditches to furrows created by other tillage implements to other situations. The terrain may change from uphill to downhill to side hill to concave to convex. For all these situations, the two-track tractor of this invention performs well and the operator is comfortable.

During fieldwork, the above-described surface textures can cause the tractor to have some combination of pitch, roll, bounce, and jerk. The two-track tractor of this invention uses a combination of the several above-described features to greatly reduce pitch, roll, bounce and jerk including track assembly oscillation, track assembly suspension, and active suspension for the wheel assembly.

During road travel, the ground's surface texture is generally smooth with occasional minor roughness. Implements without suspension generally allow tractors to tow them at full speed. Slowing down on poorly maintained secondary roads is allowed, expected, and necessary. Therefore, farm tractors do not need "military suspensions".

The wheel assembly is usually lightly loaded when using rear attached implements doing field tillage and heavily loaded during road travel or using certain front mounted implements or carrying supplies up front. The two-track tractor of this invention uses a combination of active and passive suspension, as described above.

For heavy weights during road travel and using certain front heavy machinery during fieldwork, the passive suspension controls: preferably using one or more pairs of rubber pads supplemented preferably by non-powered, pneumatic tires having highway treads. During road travel mode, the wheel assembly's active suspension is preferably deactivated. For most field tillage, the active suspension operates with the pairs of rubber pads gaped apart as needed for the required larger stroke of the active suspension system (see above).

Repeated pitching and associated jerk, caused by the ground's surface texture, is almost totally eliminated by the active suspension system used on the two-track tractor of this invention. For traversing occasional concave waterways or convex ridges, the stroke of the active suspension acts in series with oscillation of the track assembly's pivot forced by the counterbalance moment mechanism. Active suspension helps dampen out both surface texture bumps as well as the concave and convex terrain. The operator loves a smooth ride.

The combination of specific new structure for the tractor frame to connect various pivot points, suspension elements, various sensors, hydraulic components, and steering systems, all controlled by specific unique software imbedded in a microprocessor to provide a high level of man-machine integration has not been achieved before in an agricultural tractor or any known tractor.

The present invention does not exclude using active suspension full time for the wheel assembly's suspension. However, the dual mode suspension described is more practical and the passive mode is generally adequate for the wheel assembly's heavily loaded situations. The physical size of some of the active suspension components is much larger if there is not also a passive suspension such as rubber spring pads.

For the two-track tractor of this invention, light weight on the wheel assembly and active suspension generally occur for fieldwork mode: reducing component size and energy consumed.

The two-track tractor of this invention operates to control the wheel assembly to carry any weight imposed by the front-mounted implement or other front weight. Certain front-mounted implements, for example loaders, exert large amounts of weight onto the wheel assembly. Other front-mounted implements are used for light tillage and thus apply different amounts of weight. During turning maneuvers, the yaw resistance may be caused by a combination including inertia, lateral slope, and ground engaging components. For wide ground-engaging implements, there may be a laterally uneven drawbar-type load that the steering system has to counteract in order to keep the tractor moving in its intended path.

The two-track tractor of this invention has the wheel assembly as supplemental steering whenever there is weight on the wheel assembly.

During turning maneuvers, there is also a lateral, horizontal cantilevered load effect. For the standard two-track tractor's differential steering system, the cantilever distance is measured from about the fore-aft center of the track assemblies. For the two-track tractor of this invention, the cantilever distance for the differential steering is about the same but the supplemental steering forces provided by the wheel assembly has less lateral cantilever distance.

Cantilevered front and rear weight and corresponding inertias tend to produce lope that is generally void of jerk on smooth surfaces. Lope damping is provided by the leading arm suspension system and the wheel assembly's suspension systems.

The wheel assembly of the two-track tractor of this invention makes raising the front of the track assemblies possible. This reduces some of the tread bar's penetration into the ground. Track assemblies have to skid laterally in order to steer. When turning sharp, the standard two-track tractor tends to severely disturb ground surfaces because of tread bar penetration coupled with lateral skid. The two-track tractor of this invention, as distinguished, significantly reduces ground disturbance.

The control system of the two-track tractor of this invention independently varies the moment-producing hydraulic pressure to each track assembly, as already described in detail above. This independence is advantageous in situations such as turning under load, wherein the outside track assembly needs to produce added traction force. Differential steer makes this happen. Lifting the front of the inside track assembly only, that is producing less traction force, reduces lateral turning resistance. The outside track often needs to maintain uniform ground pressure in order to maximize its traction capability in order to make the turn. The two-track tractor of the invention accomplishes this.

The signal and decision to do independent varying of the two counterbalance moments could come from the wheel assembly's angle sensor with certain other conditions contributing to the decision.

Although the invention has been explained in relation to its preferred embodiment, it is to be understood that many other possible modifications and variations can be made without departing from the spirit and scope of the invention as herein described.

What is claimed is:

1. An agricultural tractor, comprising
a pair of track assemblies including rubber treads with track bars, the track assemblies interconnected by respective front and rear axles extending substantially perpendicular to a direction of travel;
a front wheel assembly;
a front axle load sensor for monitoring a weight on the front wheel assembly; and
a controller that automatically controls a load imposed by the weight of the vehicle on the front wheel assembly, as detected by the front axle load sensor, in order to control a load imposed by the weight of the vehicle at the front axle of the track assemblies to minimize rubber tread wear during travel on roads.

2. The two-track tractor as set forth in claim 1, wherein the controller controls turn angle geometry to maintain correct alignment for a pivot turn.

3. The two-track tractor as set forth in claim 1, wherein the controller controls the load when carrying a front mounted implement.

4. The two-track tractor as set forth in claim 1, wherein the track assemblies and the front wheel assembly include respective weight profiles or loads controlled by the controller.

5. The two-track tractor as set forth in claim 1, wherein the track assemblies are mounted on pivot shafts such that a moment is applied to the track assemblies via a hydraulic cylinder with a moment arm.

6. The two-track tractor as set forth in claim 5, wherein the front wheel assembly reacts to moments generated about a track assembly mounting pivot.

7. The two-track tractor as set forth in claim 1, further including spring elements for suspension of the track assemblies.

8. The two-track tractor as set forth in claim 7, further including an accumulator for suspension of the track assemblies.

9. The two-track tractor as set forth in claim 1, further comprising additional sensors, wherein the controller receives and processes signals from the additional sensors.

10. The two-track tractor as set forth in claim 1, wherein each of the two track assemblies is attached to a hydraulic cylinder and wherein another end of the hydraulic cylinder is attached to a center structure of the tractor.

* * * * *